(12) United States Patent
Ogawa

(10) Patent No.: US 6,441,362 B1
(45) Date of Patent: Aug. 27, 2002

(54) STYLUS FOR OPTICAL DIGITIZER

(75) Inventor: Yasuji Ogawa, Otone-machi (JP)

(73) Assignee: Kabushikikaisha Wacom (JP)

( * ) Notice: Subject to any disclaimer, the term of this patent is extended or adjusted under 35 U.S.C. 154(b) by 0 days.

(21) Appl. No.: 09/428,902

(22) Filed: Oct. 28, 1999

Related U.S. Application Data

(62) Division of application No. 09/024,001, filed on Feb. 13, 1998, now Pat. No. 6,100,538.

(30) Foreign Application Priority Data

Jun. 13, 1997 (JP) .............................................. 9-172802

(51) Int. Cl.$^7$ ................................................ G06M 7/00
(52) U.S. Cl. ...................... 250/221; 345/179; 178/19.04
(58) Field of Search ................................. 250/221, 226, 250/559.29, 559.38, 206.1, 206.2; 341/5; 178/18.09, 19.01, 19.04, 19.05, 18.01, 18.08, 18.11; 345/173, 175, 179

(56) References Cited

U.S. PATENT DOCUMENTS

| | | | | |
|---|---|---|---|---|
| 3,761,620 A | * | 9/1973 | Graven | 178/18 |
| 4,772,763 A | * | 9/1988 | Garwin et al. | 178/19.01 |
| 4,883,926 A | * | 11/1989 | Baldwin | 178/18 |
| 4,936,683 A | * | 6/1990 | Purcell | 356/152 |
| 5,495,269 A | * | 2/1996 | Elrod et al. | 345/179 |
| 5,608,528 A | * | 3/1997 | Ogawa | 356/375 |

* cited by examiner

Primary Examiner—Que T. Le
Assistant Examiner—Thanh X. Luu
(74) Attorney, Agent, or Firm—Adams & Wilks

(57) ABSTRACT

An optical digitizer is constructed for determining a position of a pointing object projecting a light and being disposed on a coordinate plane. In the optical digitizer, a detector is disposed on a periphery of the coordinate plane and has a view field covering the coordinate plane for receiving the light projected from the pointing object and for converting the received light into an electric signal. A processor is provided for processing the electric signal fed from the detector to compute coordinates representing the position of the pointing object. A collimator is disposed to limit the view field of the detector below a predetermined height relative to the coordinate plane such that through the limited view field the detector can receive only a parallel component of the light which is projected from the pointing object substantially in parallel to the coordinate plane. A shield is disposed to enclose the periphery of the coordinate plane to block a noise light other than the projected light from entering into the limited view field of the detector.

10 Claims, 20 Drawing Sheets

STYLUS FOR OPTICAL DIGITIZER

The present application is based on prior U.S. application Ser. No. 09/024,001, filed on Feb. 13, 1998, now U.S. Pat. No. 6,100,538 incorporated by reference, and priority thereto for common subject matter is hereby claimed.

BACKGROUND OF THE INVENTION

1. Field of the Invention

The present invention generally relates to an optical stylus configured as a pointer for use in an optical digitizer used for inputting in a computer a coordinate indicated by the pointer or another pointing object such as a finger, a stylus or a pointing stick (hereafter, generically referred to as a pointer) disposed on a coordinate plane by optically detecting the position of the pointer with an image sensor from a periphery of the coordinate plane. More particularly, the present invention relates to an optical digitizer suitable for constructing a pen computing system in combination with a large-sized flat display panel such as a plasma display device or a liquid crystal display device such that a screen of the flat display panel is superposed with the coordinate plane of the optical digitizer. The present invention also relates to a display apparatus provided with such an optical digitizer.

2. Description of Related Art

Recently, a large-sized plasma display panel (PDP) having a diagonal length is as large as 40 inches or more has been developed and is available for practical utilization. As for a liquid crystal display (LCD), one having a screen of the class of 40 inches has been tentatively fabricated by connecting a plurality of smaller panels together. Such large-sized display devices find convenient applications in the making of presentations in a conference room or the like by serving as a monitor screen of a personal computer, for example. If a pointing operation or a marking operation on a personal computer is performed by touching the screen with a finger directly or with a stylus rather than by operating a pointing device known as a mouse, the audience before the presentation can observe both the presenter and the screen, thereby having the sense of a presentation made by use of a blackboard for more effective presentation. Therefore, display apparatuses having the output screen unitized also as the input coordinate plane have been developed by combining a display panel, a digitizer, and a touch-sensitive panel.

Conventionally, a so-called stereo method is known as a digitizing method considered comparatively easy to combine with a large-size display, in which two television cameras are used to pick up a light point of a stylus to obtain the position thereof. As shown in FIG. 24, in the stereo method, a coordinate plane 1 is arranged thereon with a stylus 2 which can be operated manually. The stylus 2 is attached at tip thereof with a light-emitting member 24. It should be noted that the coordinate plane 1 is superimposed on a large-sized display panel such as a PDP or LCD. Around the coordinate plane 1, TV cameras 12L and 12R are arranged separately on the left and right sides, respectively. The TV cameras 12L and 12R pick up the light point of the stylus 2, and input the picked up light point into a coordinate computing processor 19 as a video signal. The coordinate computing processor 19 processes the image of the stylus 2 to compute positional information (or positional coordinate), and sends the computed positional information to a personal computer 5. Based on the input positional information, the personal computer 5 generates an image signal, and sends the same to a display panel 6. Based on the received image signal, the display panel 6 displays the positional information of the stylus 2, thereby implementing a real-time pointing operation. It should be noted that the positional coordinate of the stylus 2 can be computed based on triangulation.

Referring to FIG. 25, a side view of the conventional display apparatus shown in FIG. 24 is illustrated. The output screen of the display panel 6 made of a large-sized PDP serves also as the input coordinate plane 1. The stylus 2 is operated on the coordinate plane 1. The stylus 2 has attached at a tip thereof a light-emitting member 24 such as a light-emitting diode (LED). The two TV cameras 12L and 12R pick up the light projected or radiated from the light-emitting member 24. FIGS. 24 and 25 consequently show a typical constitution of the conventional stereo method.

However, the conventional digitizers using TV cameras such as described above are too sensitive to extraneous noise caused by lights such as indoor illumination light and sunlight entered through a room window, thereby causing operation errors. Further, the conventional digitizers, when combined with a display panel, pick up the light radiated from the screen, causing operation errors. The PDP is a display of self light-emitting type and therefore emits a considerable amount of light. As for the LCD of the transmitting type using a back light souce, light is radiated from the back plane through the screen at a considerable intensity. Especially, if the pointer is of a passive type that indirectly projects a light by reflecting an extraneous light, the light quantity projected from the pointer is smaller than that of an active type of the pointer having a light-emitting member and directly projecting a light, so that the detection of the light point is seriously affected by the extraneous light, often resulting in operation errors. Still further, because the light point on the coordinate plane is picked up by the TV cameras from the periphery of the coordinate plane, the TV cameras must be arranged around the display panel. This arrangement imposes many restrictions to the installation due to the view field and contour requirements of the TV cameras, preventing a compact installation from being realized. Yet further, positioning of the TV cameras relative to the coordinate plane is cumbersome and difficult, thereby hampering ease of use of the conventional optical digitizing systems.

SUMMARY OF THE INVENTION

It is therefore an object of the present invention to provide an optical digitizer capable of operating with stability without being affected by extraneous light including light radiated from the display panel of the digitizer. It is another object of the present invention to provide an optical digitizer capable of compact installation by removing the restrictions in mounting a detecting unit for detecting the light point of a pointer. It is still another object of the present invention to provide an optical digitizer capable of identifying a plurality of different pointers by detecting colors of pointers and processing simultaneous inputs from the plurality of different pointers. It is yet another object of the present invention to provide an optical digitizer capable of efficiently processing additional information such as writing pressure of the pointer against a coordinate plane in addition to the positional information of the pointer. It is a separate object of the present invention to provide a display apparatus for suitable use in a conference support system with the optical digitizer combined with a large-sized display panel. It is a different object of the present invention to provide an optical stylus best suited to the inventive optical digitizer.

The inventive optical digitizer is constructed for determining a position of a pointing object projecting a light and being disposed on a coordinate plane. In the inventive optical digitizer, detector means is disposed on a periphery of the coordinate plane and has a field of view covering the coordinate plane for receiving the light projected from the pointing object and for converting the received light into an electric signal. Processor means is provided for processing the electric signal fed from the detector means to compute coordinate representing the position of the pointing object. Collimator means is disposed to limit the view field of the detector means below a predetermined height relative to the coordinate plane such that through the limited view field the detector means can receive only a parallel component of the light which is projected from the pointing object substantially parallel to the coordinate plane. Shield means is disposed to enclose the periphery of the coordinate plane to block a noise light other than the projected light from entering into the limited view field of the detector means.

Preferably, the detector means comprises a pair of linear image sensors for receiving the projected light at different directions to produce electric signals representing a pair of one-dimensional images of the pointing object, so that the processor means processes the one-dimensional images to compute two-dimensional coordinate of the position of the pointing object.

Preferably, the collimator means comprises a collimator lens for converging only the parallel component of the projected light onto a receiving surface of the detector means. Specifically, the collimator lens has a flat bottom face, a flat top face and a curved lens face between the flat bottom face and the flat top face so that an optical axis of the collimator lens aligns parallel to the coordinate plane when the flat bottom face of the collimator lens is placed in contact with the coordinate plane. In such a case, the optical digitizer includes optical means having at least one of a reflector and a refractor disposed in an optical path between the collimator lens mounted on the coordinate plane and the detector means mounted above the coordinate plane for directing the light collected by the collimator lens to the detector means. Alternatively, the collimator lens has an optical axis vertical to the coordinate plane, and reflector means is disposed on the coordinate plane for reflecting the parallel component of the projected light vertically to the collimator lens.

Preferably, the inventive optical digitizer further comprises a light source for providing an illumination light over the coordinate plane, so that the detector means receives the light which is passively projected from the pointing object by reflection of the illumination light. Specifically, the light source intermittently turns on and off to provide a flashing illumination light, and the processor means processes the electric signal which is fed from the detector means in synchronization with the flashing illumination light so as to compute the position of the pointing object illuminated by the light source. Further, the detector means comprises an image sensor composed of an accumulator for accumulating electric charge generated by the received light so as to convert the received light into the electric signal, and a shutter gate which switches between an open state and a closed state in synchronization with the flashing illumination light so as to control accumulation of the electric charge in the accumulator.

Preferably, the light source intermittently turns on and off to provide the flashing illumination light while cyclically changing a color of the flashing illumination light. The detector means receives the light reflected by the pointing object having a particular surface color so that the electric signal cyclically varies in dependence on the particular surface color of the pointing object. The processor means processes the electric signal so as to discriminate the particular surface color of the pointing object as well as to compute the position of the pointing object.

Preferably, the light source provides an illumination light having a first wavelength. The detector means has an optical filter for selectively receiving the light which is projected from a fluorescent surface of the pointing object illuminated by the light source and which has a second wavelength different than the first wavelength. Specifically, the light source provides an illumination light having a first wavelength in an ultraviolet range, and the detector means has an optical filter for selectively receiving the light having a second wavelength in a visible range.

Preferably, the detector means comprises a color image sensor for receiving the projected light specific to color information assigned to the pointing object and for converting the received light into a corresponding electric signal. The processor means processes the electric signal so as to discriminate the color information of the pointing object as well as to compute the position of the pointing object.

The inventive stylus has a point light movable along a coordinate plane according to drawing operation and being used as an input for an optical digitizer which converts the point light into an electric signal to compute coordinate of a position of the point light. The optical stylus is comprised of a holder portion manipulated to perform the drawing operation, and a tip portion protruding from the holder portion and forming the point light. The tip portion is composed of a light emitting member for emitting a light and a light guide member for encapsulating the light emitting member. The light guide member is composed of a transparent material shaped into a tube having a closed tip end, an open end, an outer face and an inner face. The light emitting member is mounted in the open end of the tube. At least one of the outer face and the inner face can scatter the light emitted from the light emitting member.

Expediently, The inventive optical stylus is comprised of a holder portion manipulated to perform the drawing operation and incidental operation associated with the drawing operations, and a tip portion protruding from the holder portion and having a light emitting member for emitting a light to form the point light. The holder portion includes modulation means for controlling the light emitting member in response to the incidental operation to change a color tone of the light emitted from the light emitting member, so that the optical stylus can input information of the incidental operation into the optical digitizer in addition to information of the drawing operation.

Expediently, the inventive optical stylus is comprised of a holder portion manipulated to perform the drawing operation with variation of pen pressure, and a tip portion protruding from the holder portion and having a light reflecting member for reflecting an illumination light to form the light spot. The light reflecting member comprises a slider section having a first color and sliding up and down in response to the pen pressure, and a cover section having a second color and covering the slider section, such that a ratio of the first color and the second color of the light spot changes according to the pen pressure so that the optical stylus can input information of the pen pressure into the optical digitizer in addition to the position of the optical stylus.

The inventive display apparatus is constructed for determining a position of a pointing object projecting a light and being disposed on a coordinate plane and for coincidentally displaying the position of the pointing object on the same coordinate plane. In the inventive display apparatus, detector means is disposed on a periphery of the coordinate plane and has a view field covering the coordinate plane for receiving the light projected from the pointing object and for converting the received light into an electric signal. Processor means is provided for processing the electric signal fed from the detector means to compute coordinate representing the position of the pointing object. Collimator means is disposed to limit a vertical width of the view field of the detector means below a predetermined height relative to the coordinate plane such that through the limited view field the detector means can receive only a parallel component of the light which is projected from the pointing object substantially in parallel to the coordinate plane. Shield means is disposed to enclose the periphery of the coordinate plane and has a vertical width sufficient to block a noise light other than the projected light from entering into the limited view field of the detector means. A display panel is mounted to define a screen in superposed relation with respect to the coordinate plane. Output means is provided for displaying the position of the pointing object on the screen according to the computed coordinate.

According to the present invention, the novel optical digitizer is hardly affected by the extraneous lights including the display light radiated from the display panel. Further, the novel optical digitizer realizes compact installation by reducing the restriction of mounting the detector on the coordinate plane. Still further, the novel optical digitizer is capable of detecting the color tones of pointers, thereby recognizing a plurality of different pointers and enabling simultaneous inputs by the plurality of pointers. In addition, the novel optical digitizer is capable of efficiently transmitting additional information such as a stylus pressure applied to the coordinate plane.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings.

Figure 1:
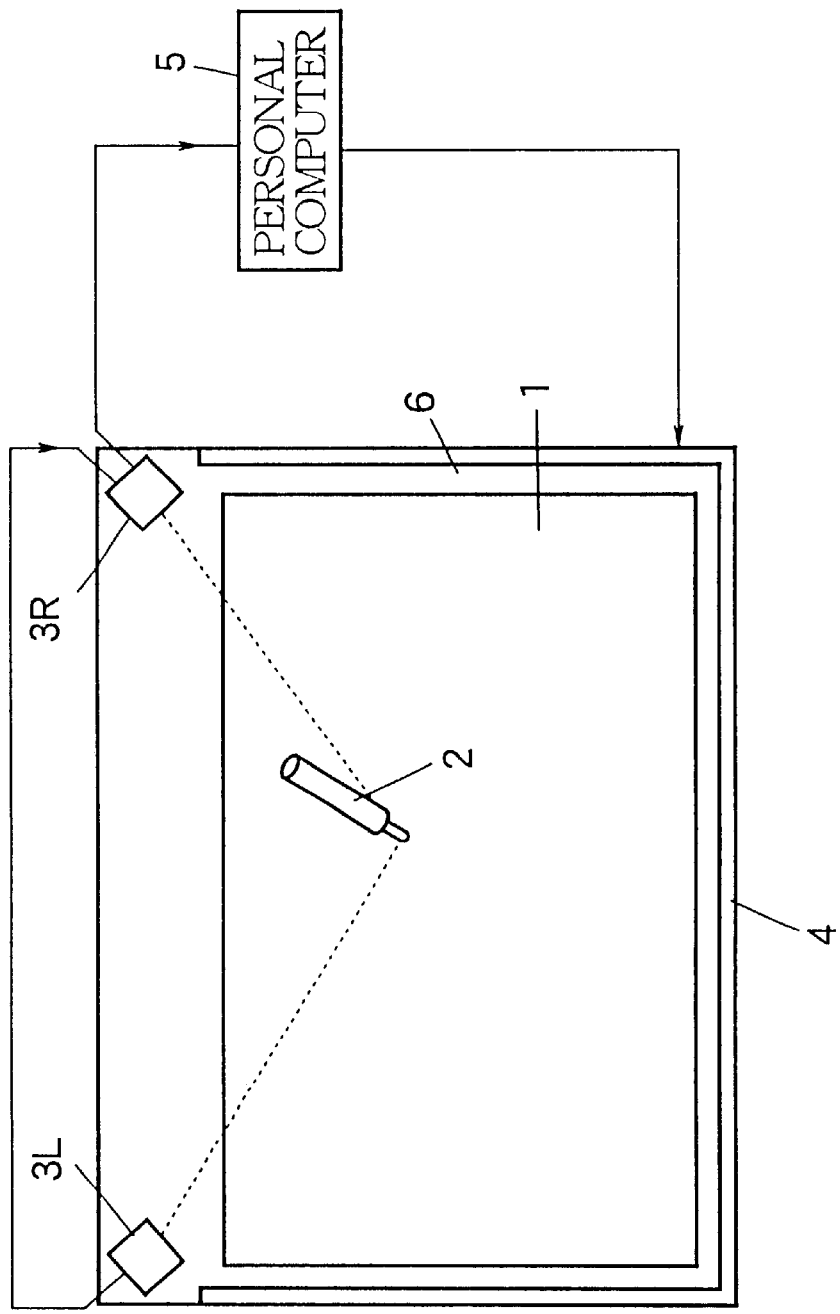
FIG. 1 is a top view illustrating an optical digitizer practiced as a first preferred embodiment of the present invention.

Now, referring to FIG. 1, there is shown a schematic top view illustrating a display apparatus practiced as a first preferred embodiment of the present invention. This display apparatus has a combination of an optical digitizer and a display panel 6, and uses a stylus 2 for an inputting device or pointer. In order to obtain positional coordinate of the stylus 2 that projects light directly or indirectly on a coordinate plane 1, the digitizer is provided with detector means in the form of a pair of left-hand and right-hand detecting units 3L and 3R arranged around the coordinate plane 1 to receive the projected light, and to convert the same into an electrical signal, and processor means for processing this electrical signal to compute the positional coordinate of the pointer. It should be noted that the present embodiment incorporates the processor means in the detecting units. The display panel 6 is constituted by a 42-inch PDP or LCD, and has a screen that superimposes on the coordinate plane 1 of the digitizer. Further, the present display apparatus has a personal computer 5 that generates an image signal based on the positional information or positional coordinate output from the detecting unit 3R, and displays the positional coordinate indicated by the stylus 2 onto the screen of the display panel 6. It should be noted that each of the detecting units 3L and 3R incorporates collimator means for limiting a view field of the detecting unit to a predetermined width in the vertical direction from the coordinate plane 1 to make a range of receivable projected light parallel to the coordinate plane 1. Moreover, shield means in the form of a shield frame 4 is arranged to enclose a periphery of the coordinate plane 1, the shield frame 4 being wide enough in the vertical direction for blocking undesired noise light other than the projected light away from the field of view field of each of the detecting units 3L and 3R. This width is 1 cm to 2 cm for example in the height direction from the coordinate plane 1.

The following describes operations of the first preferred embodiment shown in FIG. 1. The present display apparatus uses the optical stylus 2 as an input device, which is manually operated on the coordinate plane 1 to input positional coordinate indicative of a desired pattern such as a character or a graphic. The pair of left-hand and right-hand detecting units 3L and 3R are arranged separately from each other by a predetermined distance in the horizontal direction over the coordinate plane 1. Each of the detecting units 3L and 3R receives the light projected from the stylus 2 to generate an electrical signal. In the present embodiment, the left-hand detecting unit 3L receives the light projected from the stylus 2 to generate an electrical signal indicative of left angular information, and sends the generated electrical signal to the right-hand detecting unit 3R. The right-hand detecting unit 3R receives the light projected from the stylus 2 to generate another electrical signal indicative of right angular information. Further, the processor means incorporated in the right-hand detecting unit 3R sends to the personal computer 5 the positional information indicative of the positional coordinate designated by the stylus 2 according to triangulation based on the left angular information and the right angular information together with distance between the detecting units 3L and 3R. Based on the received positional information, the personal computer 5 generates an image signal corresponding to the positional coordinates indicated by the stylus 2. The display panel 6 operates based on the image signal input from the personal computer 5 to optically reproduce the character or graphic drawn by the stylus 2.

Figure 2:
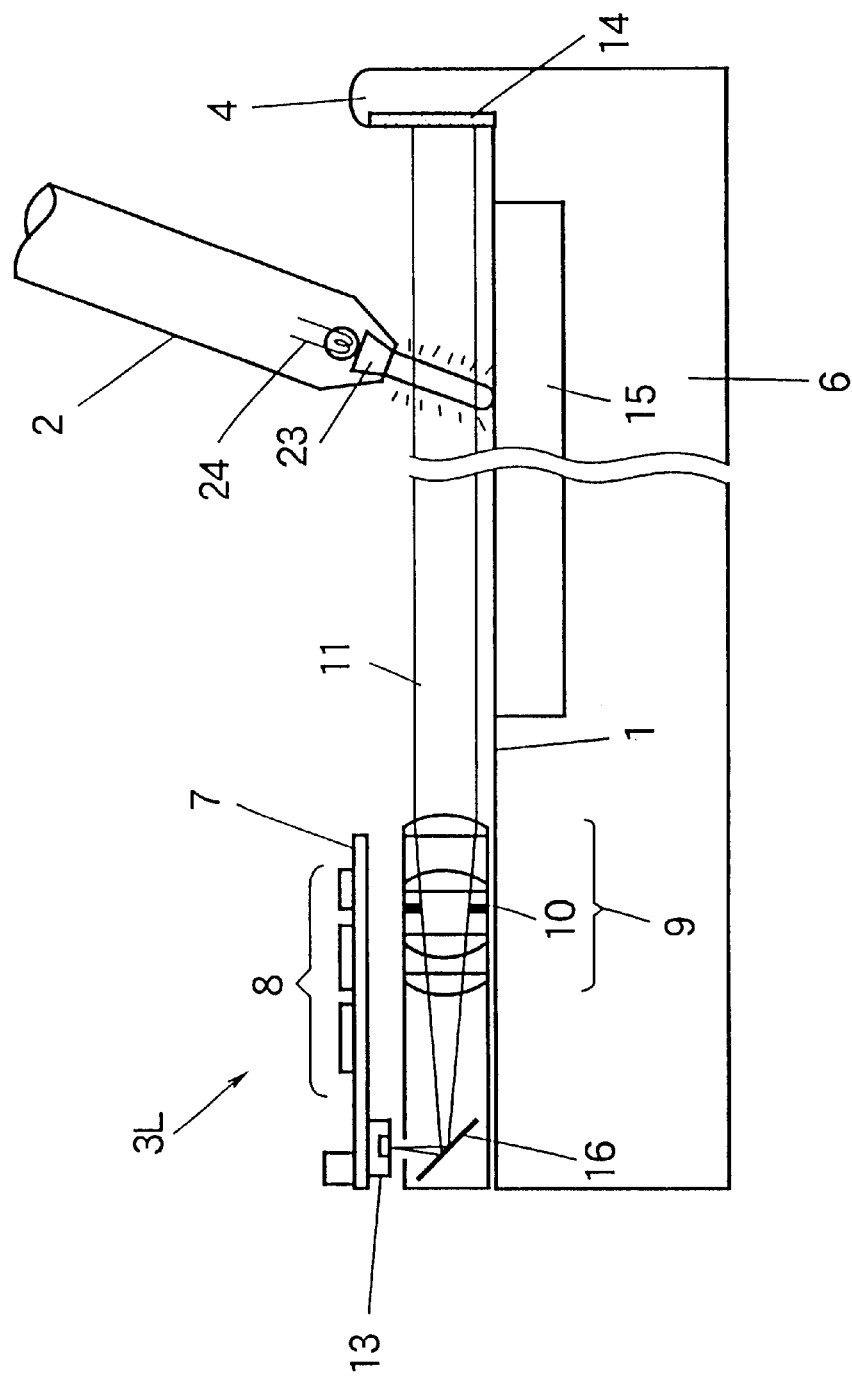
FIG. 2 is a cross section illustrating the first preferred embodiment.

FIG. 2 schematically shows a cross sectional structure of the display apparatus shown in FIG. 1. It should be noted that, in the figure, only the left-hand detecting unit 3L is illustrated; the right-hand detecting unit has a similar constitution. The left-hand detecting unit 3L and the right-hand detecting unit 3R include linear image sensors 13 that receive the light projected from the stylus 2 in different angles or bearings to generate electrical signals indicative of a one-dimensional linear image of the stylus 2. A circuit component 8 mounted on a printed circuit board assembled in the left-hand detecting unit 3L constitutes processor means, which generates left angular information based on the one-dimensional linear image supplied from the linear image sensor 13, and which sends the generated left angular information to the right-hand detecting unit 3R. The right-hand detecting unit 3R also has processor means constituted by a circuit component, which computes right angular information based on the one-dimensional linear image supplied from the linear image sensor 13 and computes a two-dimensional positional coordinate of the stylus 2 based on the computed right angular information and the left angular information supplied from the left-hand detecting unit 3L. Each of the detecting units 3L and 3R contains a collimator lens constituted by a lens group 9, which converges only a parallel component of the light projected from the stylus 2 that is substantially parallel to the coordinate plane 1 onto a light receiving surface of the linear image sensor 13, thereby making the range of receivable projected light parallel to the coordinate plane 1. The lens group 9 is sliced at the top and bottom portions thereof into a flat shape, so that the lens group 9 can be arranged on the coordinate plane 1 in parallel relation thereto. Namely, the collimator lens for use in the present embodiment is of compact and laid type. The collimator lens is a wide-angle lens having an angle of about 90 degrees in order to widely cover the coordinate plane 1. The shield frame 4 arranged to enclose the coordinate plane 1 is made of a non-reflective cloth material to prevent undesired noise light other than the projected light from entering into a field of view 11 of the linear image sensor 13. A screen 15 of the display panel 6 is superimposed on the coordinate plane 1. The stylus 2 is operated on the screen 15. The stylus 2 incorporates a light-emitting member 24 such as an LED and has a light guide member 23 at a tip end for forming a light point or bright spot. This light point stays in the collimated parallel view field 11 to be picked up by the linear image sensor 13. The display light projected vertically upward from the screen 15 is mostly excluded from the view field 11, so that there is no fear that the display light enters into the image sensor 13. In addition, extraneous light entering in the view field 11 is mostly blocked by the shield frame 4, so that there is no fear that extraneous light enters into the image sensor 13. Further, the light projected from the light point of the stylus 2 all around is absorbed by the non-reflective cloth material 14 of the shield frame 4, so that there is no chance that the secondary reflection of the light projected from the light point enters into the linear image sensor 13. Thus, in the present embodiment, the arrangement of the lens group 9 for making the view fields of the detecting units 3L and 3R generally parallel to the coordinate plane 1 and the arrangement of the shield frame 4 of a size large enough for enclosing the view field 11 around the coordinate plane 1 prevent the extraneous light from entering into the detecting units 3L and 3R. Further, the present embodiment prevents the display light projected from the screen 15 of the display panel 6 from entering into the detecting units 3L and 3R. Still further, the lens group 9 is made flat, so that the detecting units 3L and 3R can be made relatively flat as a whole. This allows the detecting units 3L and 3R to be mounted directly on the coordinate plane 1, thereby facilitating the adjustment of installation and positioning. The above-mentioned novel constitution realizes an optical digitizer that is compact in size and hardly affected by the extraneous light including the display light. Optical means in the form of a mirror 16 incorporated in each of the detecting units 3L and 3R also contributes to the realization of the compact installation. To be more specific, the mirror 16 is located in a light path connecting the lens group 9 arranged on the coordinate plane 1 to the linear image sensor 13 spaced from the coordinate plane 1. The mirror 16 reflects the light projected from the stylus 2 and collected by the lens group 9 to guide the reflected light to the light receiving surface of the linear image sensor 13.

Figure 26:
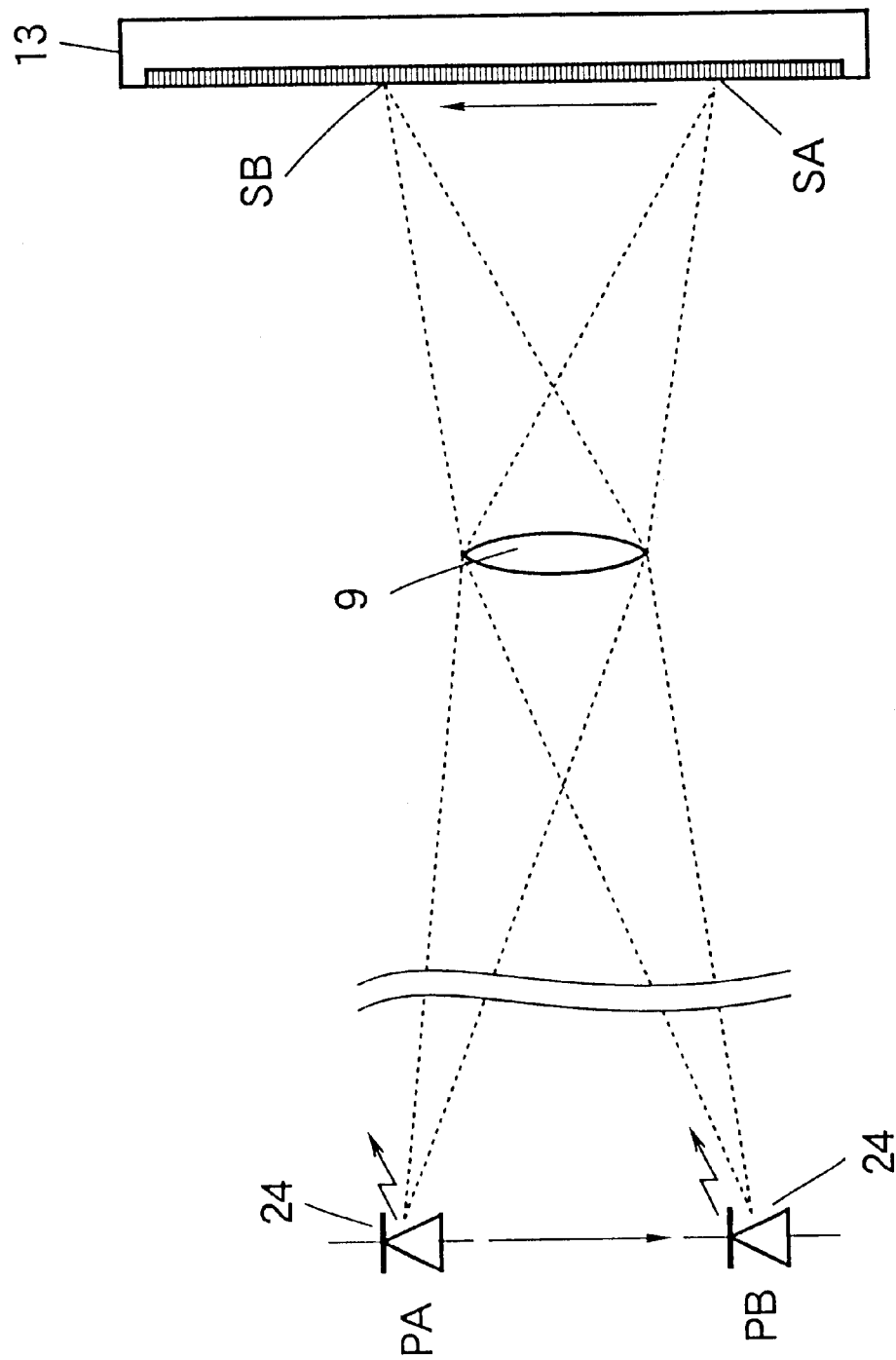
FIG. 26 is a schematic diagram illustrating the principles of the linear image sensor shown in FIG. 2.

FIG. 26 is a schematic diagram illustrating the function of the linear image sensor 13. As shown, the lens 9 is located between the light emitting-member 24 incorporated in the stylus and the linear image sensor 13. The light projected from the light-emitting member 24 is collected by the lens 9 to form an image formation point on the light receiving surface of the linear image sensor 13. The light receiving surface is linearly arranged with tiny picture elements. When the light-emitting member 24 moves from a first position PA to a second position PB, the corresponding image formation point moves from SA to SB. As is understood from the illustrated relationship of geometrical optics, the bearing of the light-emitting member 24 corresponds to the image formation point, which is detectable by the picture elements of the linear image sensor 13.

Figure 3:
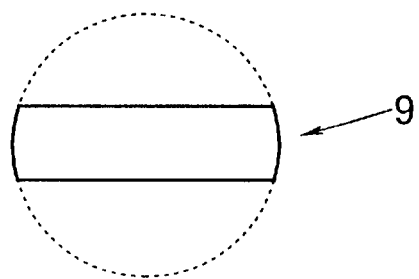
FIG. 3 is a top view illustrating a collimator lens assembled in the first preferred embodiment.

FIG. 3 is a schematic top view illustrating the shape of the lens group 9 shown in FIG. 2. As shown, the lens group 9 is sliced at the top and bottom thereof into a flat shape, so that the lens group can be arranged on the coordinate plane in parallel thereto. The flat lens group 9 can be obtained by molding plastic for example.

Figure 4:
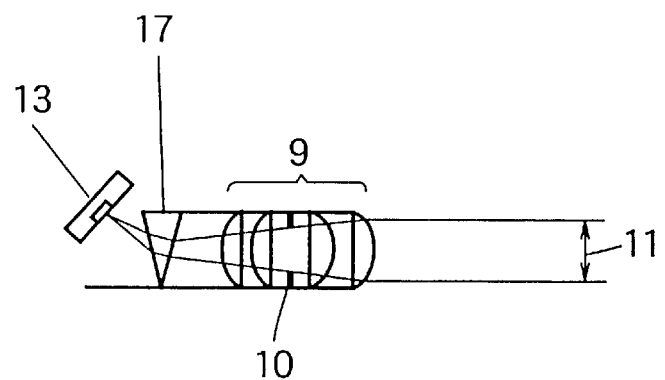
FIG. 4 is a schematic diagram illustrating a variation to the first preferred embodiment.

FIG. 4 shows a variation to the structure shown in FIG. 2. In this variation, a prism 17 constituting refractive optical means is used instead of the mirror 16 constituting reflective optical means. The prism 17 refracts the projected light collected by the lens group 9 to the light receiving surface of the linear image sensor 13. As described before, the lens group 9 makes the view field 11 generally parallel to the coordinate plane. The lens group 9 has a flat shape resulting from slicing the top and bottom of the lens in parallel around the center thereof. The prism 17 is arranged in the light path of the projected light from the lens group 9 to the linear image sensor 13 for bending the projected light.

Figure 5:
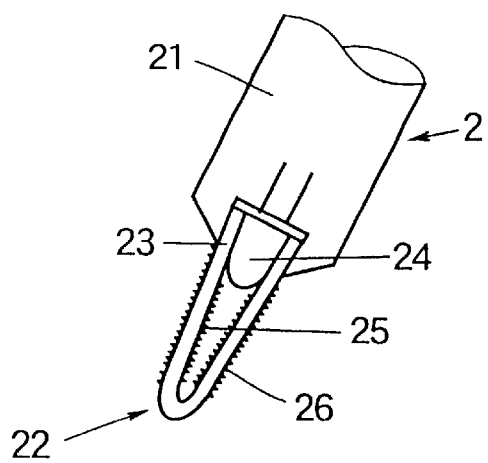
FIG. 5 is a schematic diagram illustrating one example of a stylus for use in the first preferred embodiment.

FIG. 5 is a schematic partial cross section illustrating specific constitution of the stylus shown in FIG. 2. The stylus 2 is used as the input device for the optical digitizer that detects a light point moving on the coordinate plane, converts the light point into an electrical signal, and processes this electrical signal to compute positional coordinate. The stylus 2 has the light point that moves around over the coordinate plane. The stylus 2 further has a holder portion 21 which is handled for enabling a drawing operation and a tip portion 22 for forming the light point. The tip portion 22 is composed of an active light-emitting member 24 constituted by an LED for example and a light guide member 23 made of acrylic resin for example. The light guide member 23 has a tube shape of cone or cylinder bored from the bottom. At least one of an inner surface 25 and an outer surface 26 of the light guide member 23 is made of a transparent member having a light scattering or diffusing property. The light-emitting member 24 is attached to the bottom of the light guide member 23. In the present embodiment, bumps and dips are formed on the inner surface 25 and the outer surface 26 of the bored light guide member 23. These bumps and dips are constituted by transparent microscopic prisms. These bumps and dips can be formed by embossing. According to the above-mentioned constitution, a commercially available LED for example can be used as the light-emitting member 24 to be assembled in the stylus 2, and the light projected from the light-emitting member 24 can be efficiently projected along the coordinate plane.

Figure 6:
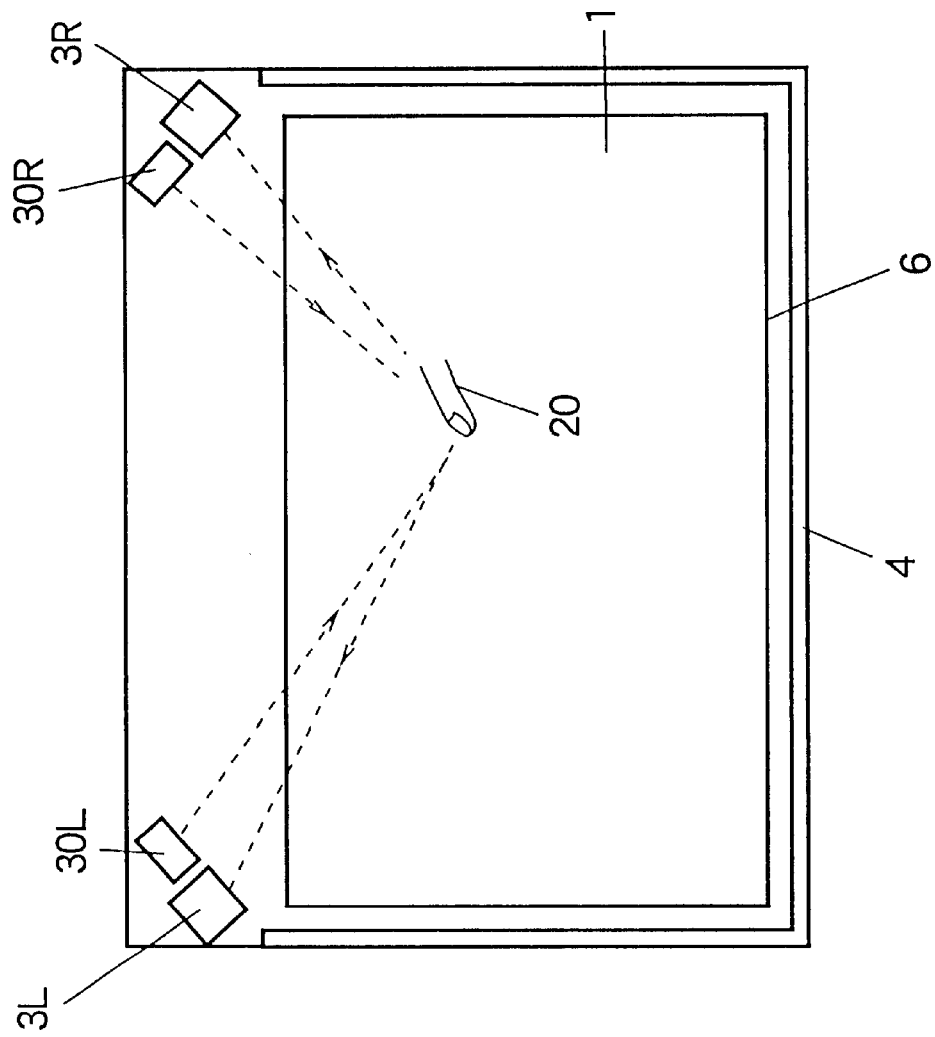
FIG. 6 is a top view illustrating an optical digitizer practiced as a second preferred embodiment of the present invention.

FIG. 6 is a top view illustrating a display apparatus practiced as a second preferred embodiment of the present invention. This display apparatus has an optical digitizer for obtaining positional coordinate of a pointer that indirectly projects light on the coordinate plane 1. In the present embodiment, an operator's finger 20 is used as the pointing object or the pointer. The optical digitizer has a pair of left-hand and right-hand detecting units 3L and 3R which are arranged around the coordinate plane 1 and which receive the light reflected from the finger 20 to convert the received light into an electrical signal. Each of the detecting units 3L and 3R incorporates processor means for processing the electrical signal to compute the positional coordinate of the finger 20. In addition, this optical digitizer has a pair of illuminating units 30L and 30R each having a light source for illuminating the coordinate plane 1. The left-hand and the right-hand detecting units 3L and 3R receive the light reflected from the illuminated finger 20. The pair of left-hand and right-hand illuminating units 30L and 30R repeatedly turn on and turn off the incorporated light sources to intermittently flash the coordinate plane 1. The processor means incorporated in the detecting units 3L and 3R process the electrical signal in synchronization with this flash illumination.

Figure 7:
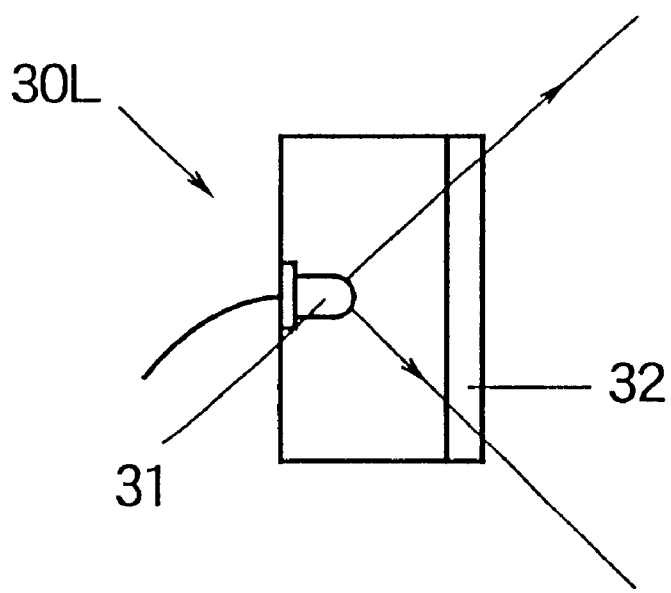
FIG. 7(a) and FIG. 7(b) are schematic diagrams illustrating an illuminating unit assembled in the second preferred embodiment.
Figure 7:
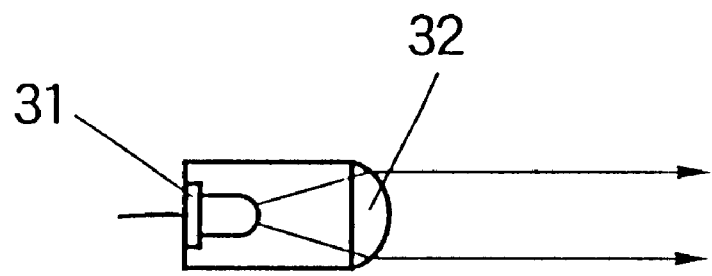

FIG. 7(a) and FIG. 7(b) show construction of the illuminating unit 30L shown in FIG. 6. FIG. 7(a) is a top view, while FIG. 7(b) is a side view. It should be noted that the other illuminating unit 30R has a similar constitution. As shown, the illuminating unit 30L incorporates a light source 31 such as an LED and has attached at the front a cylindrical lens 32. As shown in FIG. 7(a), the cylindrical lens projects the illumination light from the light source in a spread out manner to illuminate the coordinate plane through a wide angle. As shown in FIG. 7(b), in the direction vertical to the coordinate plane, the cylindrical lens converges the illumination light to some degree to project the same in a parallel manner along the coordinate plane.

Figure 8:
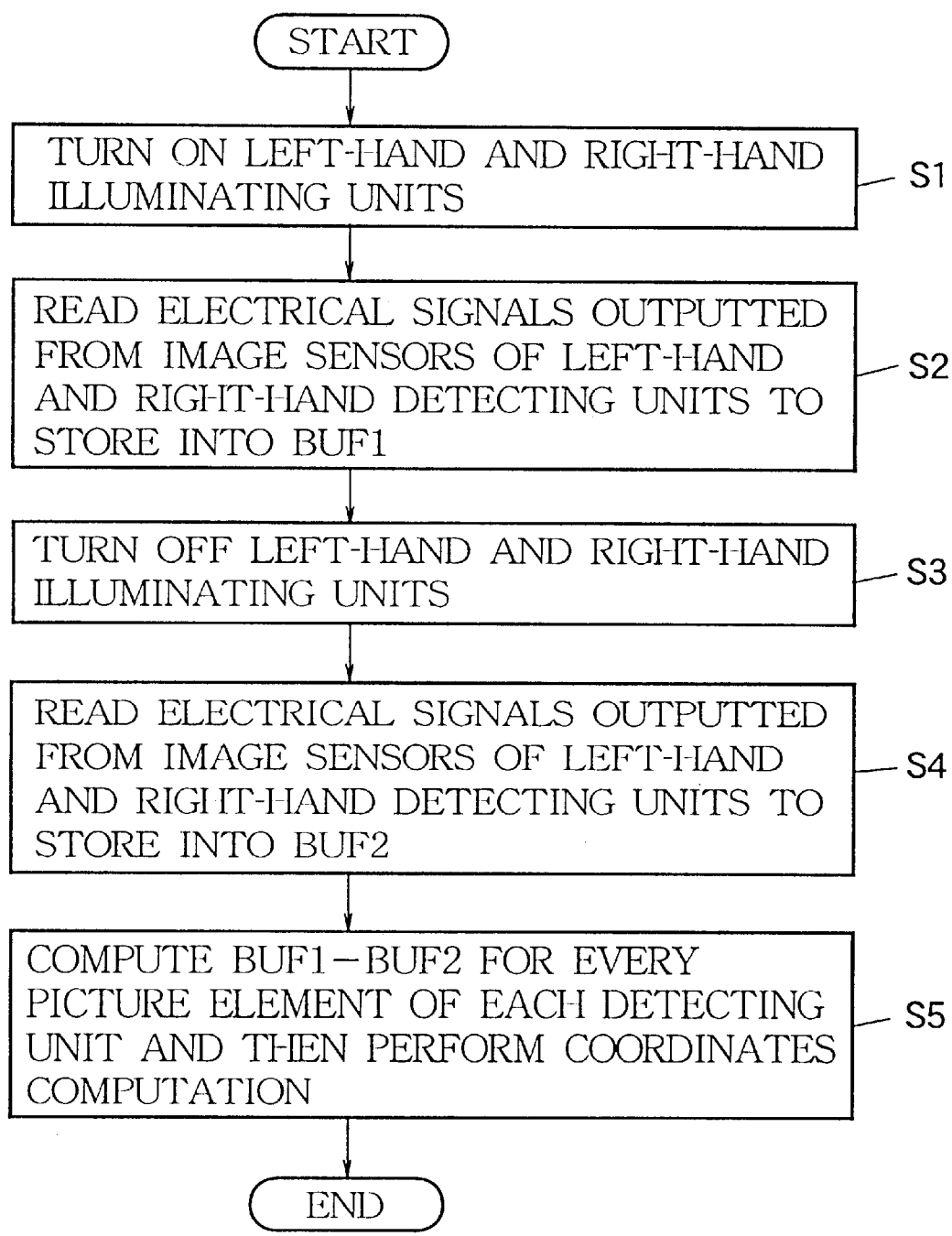
FIG. 8 is a flowchart for describing operations of the second preferred embodiment.

The following describes operation of the second preferred embodiment shown in FIG. 6 with reference to a flowchart shown in FIG. 8. First, in step S1, the left-hand and right-hand illuminating units 30L and 30R are turned on. In step S2, electrical signals output from image sensors of the left-hand and right hand detecting units 3L and 3R are read out and stored in a buffer BUF1. In step S3, the left-hand and right-hand illuminating units 30L and 30R are turned off. In step S4, electrical signals output from the image sensors of the left-hand and right-hand detecting units 3L and 3R are read out and stored in another buffer BUF2. Lastly, in step S5, computation of BUF1–BUF2 is performed for every picture element of the detecting units 3L and 3R to remove background noise and to compute positional coordinate indicated by the finger 20. Thus, in the present embodiment, the pair of left-hand and right-hand illuminating units 30L and 30R repeat turn-on and turn-off operations to flash the coordinate plane 1 intermittently. At the same time, the processor means operates in synchronization with the flash illumination to process the electrical signals output from the detecting units 3L and 3R. The above-mentioned constitution allows computation of positional coordinate while eliminating error which would be caused by the extraneous light or background light. In the present embodiment, the light reflected from the illuminated finger 20 can be distinguished from the extraneous light by electrical control, thereby realizing the optical digitizer that is hardly affected by the extraneous light. Also, when the embodiment is combined with a display panel 6 such as a PDP, the reflection component of the display light of the display panel 6 can be distinguished from the reflection component of the illumination light. Like the first preferred embodiment shown in FIG. 1, the shield frame 4 enclosing the coordinate plane 1 is provided in the present embodiment. Therefore, in addition to the effects described above, the shield frame prevents the extraneous light surrounding the coordinate plane from entering into the detecting units, thereby making the optical digitizer further resistant against extraneous light.

Figure 9:
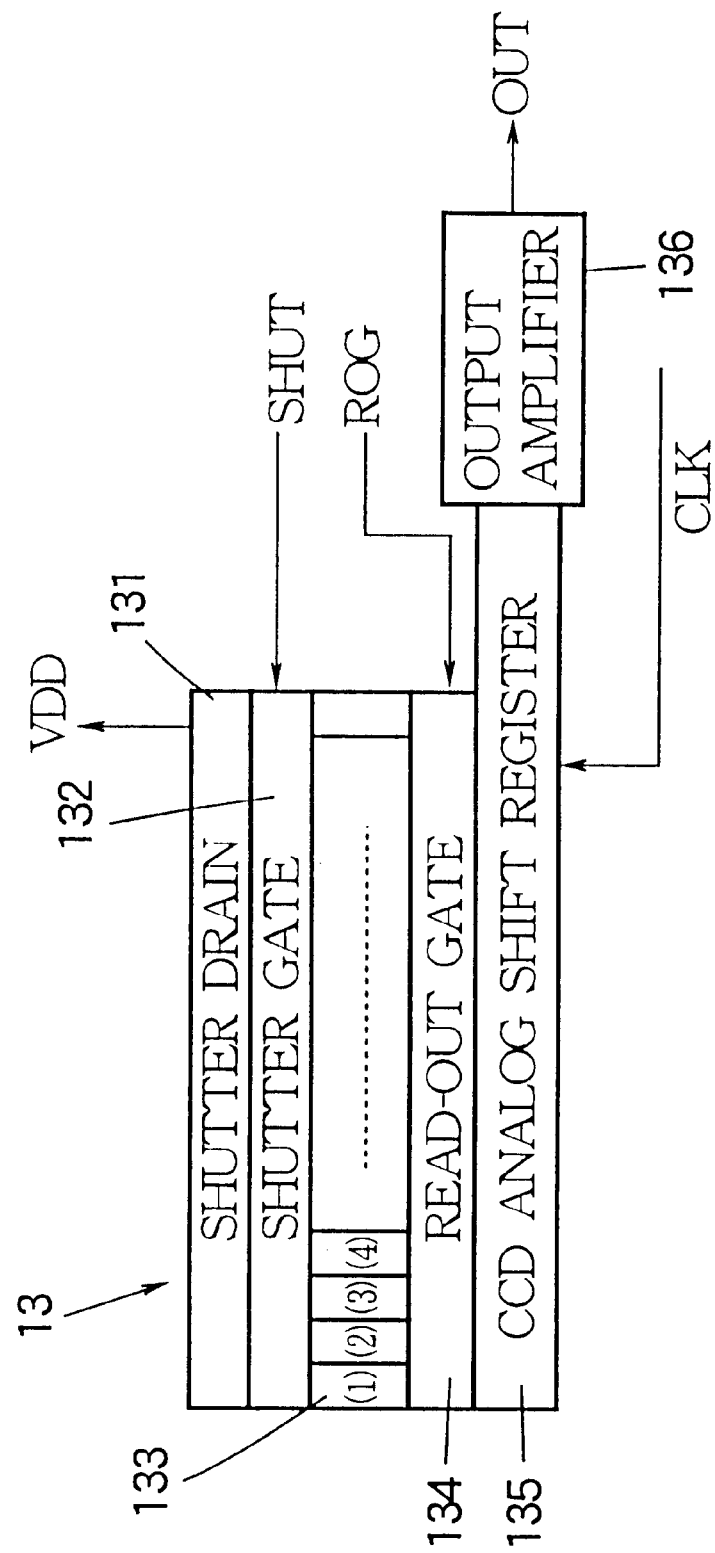
FIG. 9 is a schematic diagram illustrating one example of a linear image sensor for use in the second preferred embodiment.

FIG. 9 is a schematic diagram illustrating a specific example of the linear image sensor 13 assembled in each of the detecting units 3L and 3R shown in FIG. 6. In this example, the linear image sensor 13 has picture element cells 133 (charge accumulating devices) for accumulating an electric charge corresponding to light reception amount and for converting the accumulated charge into an electrical signal, and a shutter gate 132 for controlling the accumulation of the electric charge. This image sensor 13 opens and closes the shutter gate 132 in synchronization with the above-mentioned flash illumination. As shown, the linear image sensor 13 has a shutter drain 131, the shutter gate 132, the picture element cells 133, a read-out gate 134, a CCD analog shift register 135, and an output amplifier 136. The shutter drain 131 is supplied with a supply voltage VDD, the shutter gate 132 is supplied with a control signal SHUT, the read-out gate 134 is supplied with a control signal ROG, and the CCD analog shift register 135 is supplied with a clock signal CLK. From the output amplifier 136, an electrical signal OUT is obtained.

Figure 10:
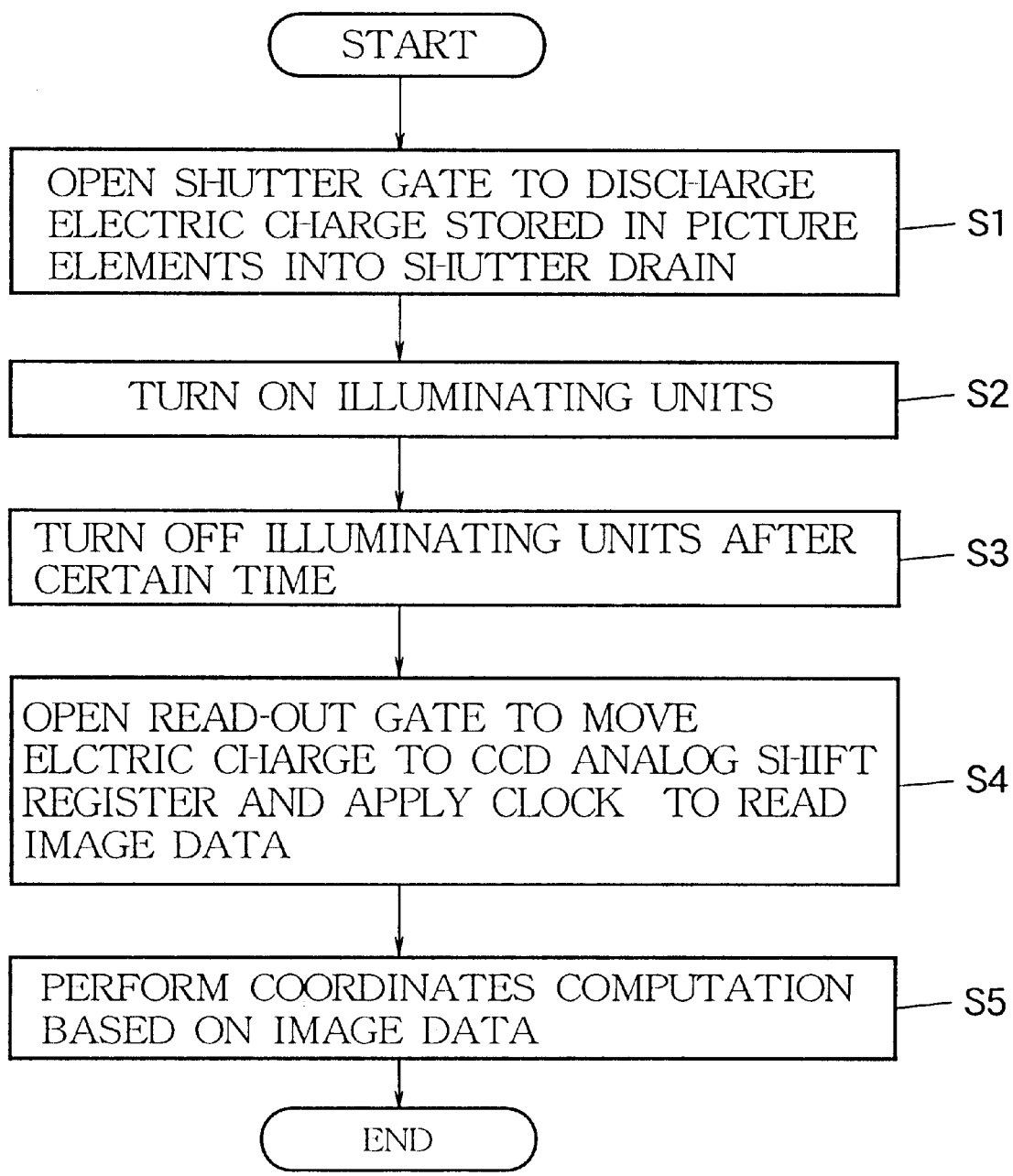
FIG. 10 is a flowchart for describing operations of the linear image sensor shown in FIG. 9.

The following describes operations of the linear image sensor 13 having the shutter capability shown in FIG. 9 with reference to a flowchart shown in FIG. 10. First, in step S1, the control signal SHUT is input to open the shutter gate 132 for discharging the electric charge accumulated in the picture element cells 133 into the shutter drain 131. Next, in step S2, the left-hand and right-hand illuminating units 30L and 30R shown in FIG. 6 are turned on. In step S3, the illuminating units 30L and 30R are turned off after a certain time. This time is set at 100 μs for example. In step S4, the control signal ROG is input to open the read-out gate 134 to move the charge from the picture element cells 133 to the CCD analog shift register 135, and the clock signal CLK is applied to the CCD analog shift register 135 to read out image data. This image data is taken out of the output amplifier 136 as the electrical signal OUT. Lastly, in step S5, based on the image data, the positional coordinate indicated by the finger 20 are computed. According to the present preferred embodiment, use of the shutter capability of the image sensor allows the illumination to operate in a flashing manner to pick up the image of the finger or the stylus only in a flash-on time, thereby minimizing the period in which extraneous light may impinge on the detecting units. This constitution in turn minimizes undesirable influence of the display light and the extraneous light.

Figure 11:
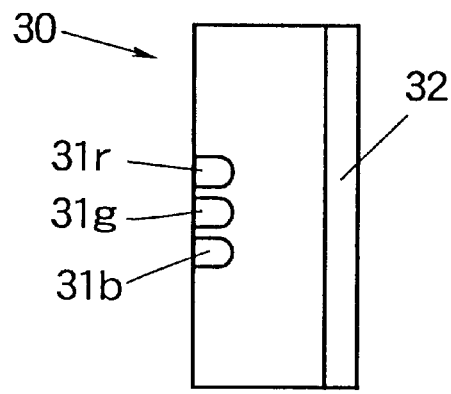
FIG. 11 is a schematic diagram illustrating an illuminating unit for use in an optical digitizer practiced as a third preferred embodiment of the present invention.

FIG. 11 is a schematic top view illustrating an illuminating unit for use in an optical digitizer practiced as a third preferred embodiment of the present invention. In this embodiment, a light source incorporated in the illuminating unit 30 is made up of a red LED 31r, a green LED 31g and a blue LED 31b. In front of these LEDs, a cylindrical lens 32 is disposed. The illuminating unit 30 switches the red, green, and blue lights projected from the LED 31r, LED 31g, and LED 31b, respectively, to illuminate the coordinate plane in a flashing manner. Accordingly, the detecting units separately receive the lights of these colors reflected from a pointer having a particular surface color in synchronization with the flash illumination. The processor means incorporated in the detecting units processes an electrical signal output from the image sensors to compute the positional coordinate of the pointer and to recognize the surface color of the pointer.

Figure 12:
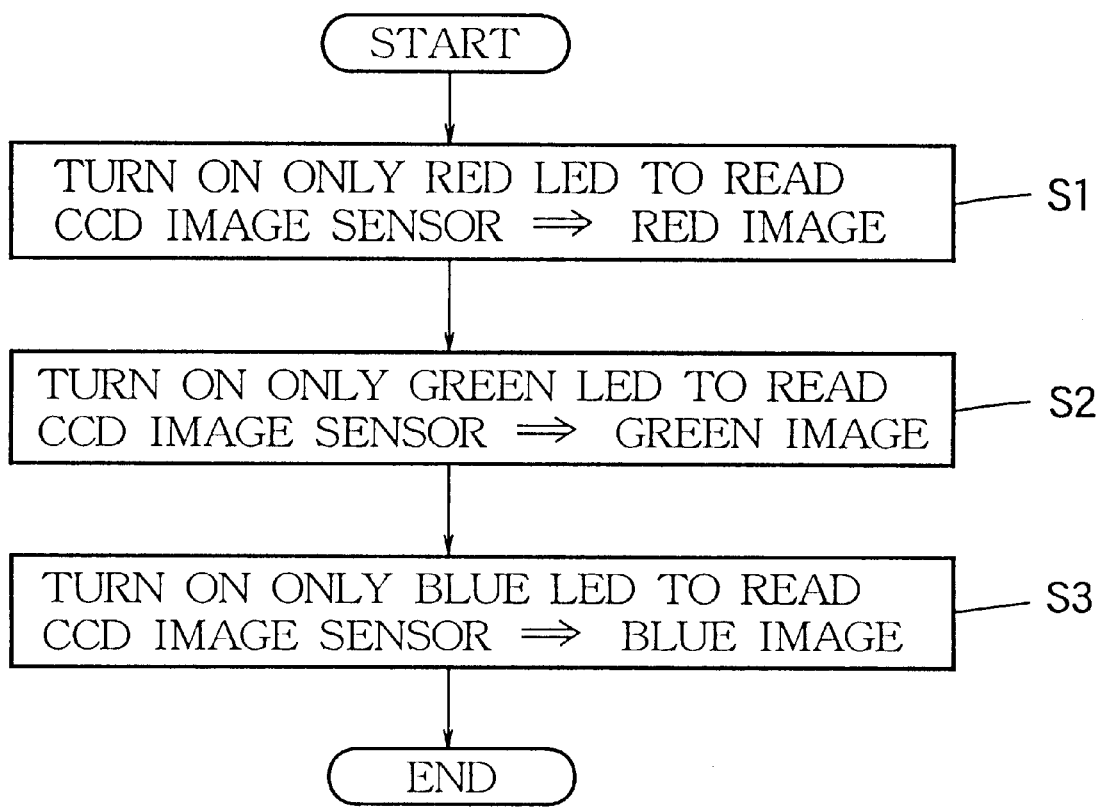
FIG. 12 is a flowchart for describing operations of the illuminating unit shown in FIG. 11.

FIG. 12 is a flowchart for describing operations of the optical digitizer installed with the illuminating unit 30 shown in FIG. 11. First, in step S1, only the red LED 31r is turned on to read image data from the CCD image sensor. This image data is obtained under red illumination, indicating a red color separated image or a red image. Next, in step S2, only the green LED 31g is turned on to read image data from the CCD image sensor. This image data is obtained under green illumination, indicating a green color separated image or a green image. Lastly, in step S3, only the blue LED 31b is turned on to read image data from the CCD image sensor. This image is obtained under blue illumination, indicating a blue color separated image or a blue image. Thus, by use of the CCD image sensor of mono-color type, the present embodiment switches the light color of the illuminating unit among red, green, and blue to provide color separated images (red image, green image and blue image) corresponding to these colors.

Figure 13:
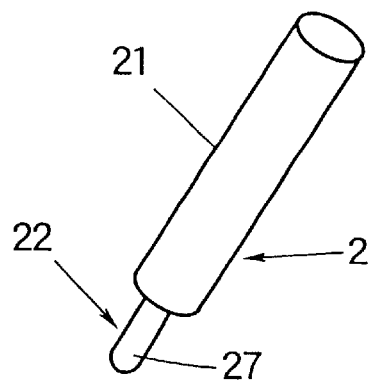
FIG. 13 is a schematic diagram illustrating a stylus for use in the third preferred embodiment.

FIG. 13 illustrates an example of a stylus for use in the above-mentioned third embodiment. The stylus 2 has a holder portion 21 and a tip portion 22. The tip portion 22 is made up of a green color member 27 that intensely reflects green light. In addition, another stylus having a red color member or a blue color member at the tip portion 22 is used as required.

Figure 14:
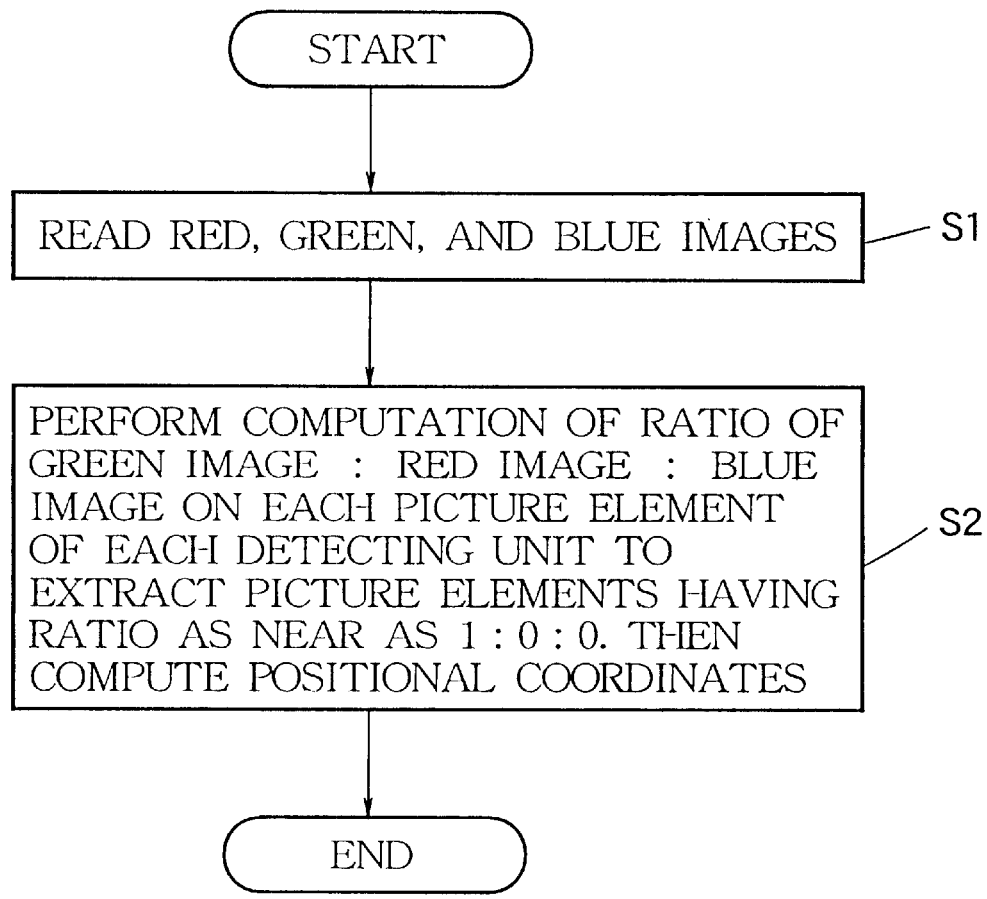
FIG. 14 is a flowchart for describing operations of the third preferred embodiment.

FIG. 14 is a flowchart for describing computational processing of the optical digitizer associated with the above-mentioned third embodiment. First, in step S1, a red image, a green image, and a blue image are read. In step S2, a ratio of the green image: red image: blue image is computed on each picture element of the detecting unit to extract picture elements having a ratio as near as 1:0:0. This can identify the stylus 2 having the green color member 27 on the tip portion 22. Then, coordinate computation is performed based on the extraction results. Thus, in the present embodiment, the illuminating unit cyclically switches the illuminating lights having different colors or wavelengths to illuminate the coordinate plane. The color of the stylus 2 is identified by magnitude change in the electrical signal outputted from the detecting unit under radiation of these illumination lights. This constitution allows inputting of color information into the optical digitizer in addition to the coordinate information. Namely, an image sensor of mono-color type can identify the color of the stylus 2, thereby providing the optical digitizer excellent in cost. In addition, the color identification contributes to exclusion of extraneous light.

Figure 15:
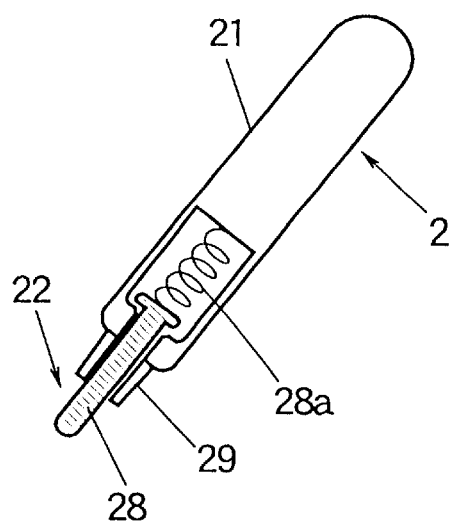
FIG. 15(a), FIG. 15(b) and FIG. 15(c) are schematic diagrams illustrating a stylus for use in an optical digitizer practiced as a fourth preferred embodiment of the present invention.
Figure 15:
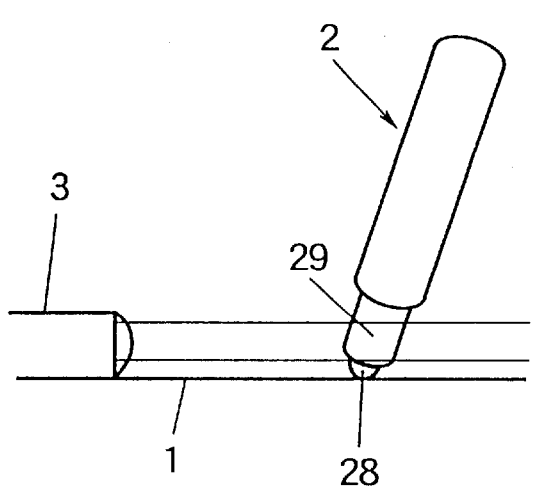
Figure 15:
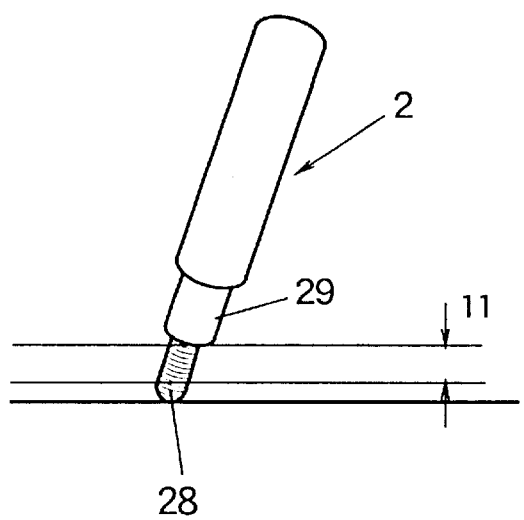

FIG. 15(a), FIG. 15(b) and FIG. 15(c) are schematic diagrams illustrating a stylus for use in an optical digitizer practiced as a fourth preferred embodiment of the present invention. Like the above-mentioned third embodiment, color information of the stylus is detected by use of an illuminating unit of light color switching type shown in FIG. 11. As shown in FIG. 15(a), this stylus 2 is for use as an input device of an optical digitizer that detects the light point moving on the coordinate plane, converts the detected light point into an electrical signal, and processes this electrical signal to output positional coordinate of the stylus. The stylus has a light point that moves around on the coordinate plane during the course of drawing operation. To be more specific, the stylus 2 has a holder portion 21 which is operated to perform a drawing operation and a thrust operation involving a change in writing pressure applied to the coordinate plane, and a tip portion 22 attached with a reflector that forms the light point by reflecting illumination light. This reflector has a slide member 28 having a first color (for example, blue) and sliding up and down in response to the writing pressure, and a cover member 29 having a second color (for example, red) and covering the slide member 28. As a ratio of the first color to the second varies with the writing pressure, this stylus can input pen pressure information in addition to positional coordinate information according to the drawing operation. It should be noted that a spring 28a is loaded in the holder portion 21 of the stylus 2 to realize up and down motion of the slide member 28 in response to the writing pressure.

FIG. 15(b) shows a state in which a relatively large writing pressure is applied to the stylus 2. FIG. 15(c) shows a state in which a relatively small writing pressure is applied to the stylus 2. Pushing the stylus 2 hard exposes the red cover member 29 into the view field 11 of the detecting unit 3. On the other hand, pushing the stylus 2 not so hard exposes the blue slide member 28 into the view field. The detecting unit recognizes the difference between these colors of the tip portion 22 of the stylus 2 to obtain the writing pressure information. This writing pressure information can be used as a stylus pen down signal or a switch signal corresponding to a mouse click signal. In the present embodiment, the illuminating unit switches between two or more colors to illuminate the coordinate plane in a flashing manner. The stylus 2 changes surface colors with up and down motion of the slide member. The detecting unit 3 separately detects, in synchronization with the flash illumination, the light of different colors caused by reflection of the flash illumination by the stylus 2 of which surface colors change. The processor means processes the electrical signal output from the detecting unit to compute the positional coordinate according to the drawing operation of the stylus 2 and recognizes a color change according to the up and down motion of the slide member. This simple constitution allows transmission of the pen down signal indicative of touching of the stylus onto the coordinate plane and a writing pressure signal to the optical digitizer. Especially, the stylus uses no special circuit component and battery to transmit the writing pressure signal to the optical digitizer, thereby providing an optical digitizer excellent in cost, maintenance and durability.

Figure 16:
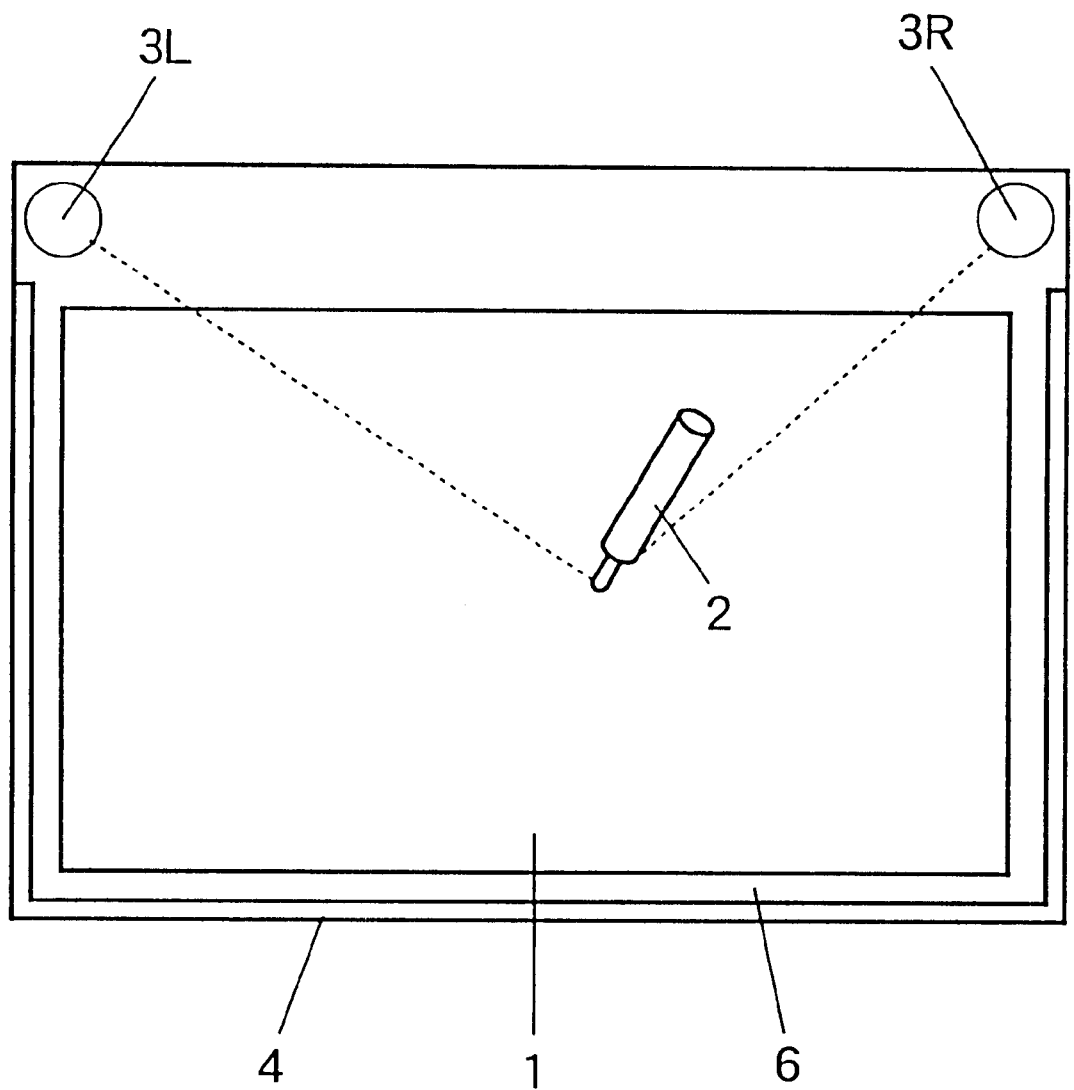
FIG. 16 is a top view illustrating an optical digitizer practiced as a fifth preferred embodiment of the present invention.

FIG. 16 is a schematic top view illustrating a display apparatus and an optical digitizer practiced as a fifth preferred embodiment of the present invention. Basically, the fifth embodiment is the same as the first embodiment. A stylus 2 and left-hand and right-hand detecting units 3L and 3R are arranged on a coordinate plane 1. In addition, the shield frame 4 encloses the coordinate plane 1. Under the coordinate plane 1, a large-sized display panel 6 such as PDP is assembled.

Figure 17:
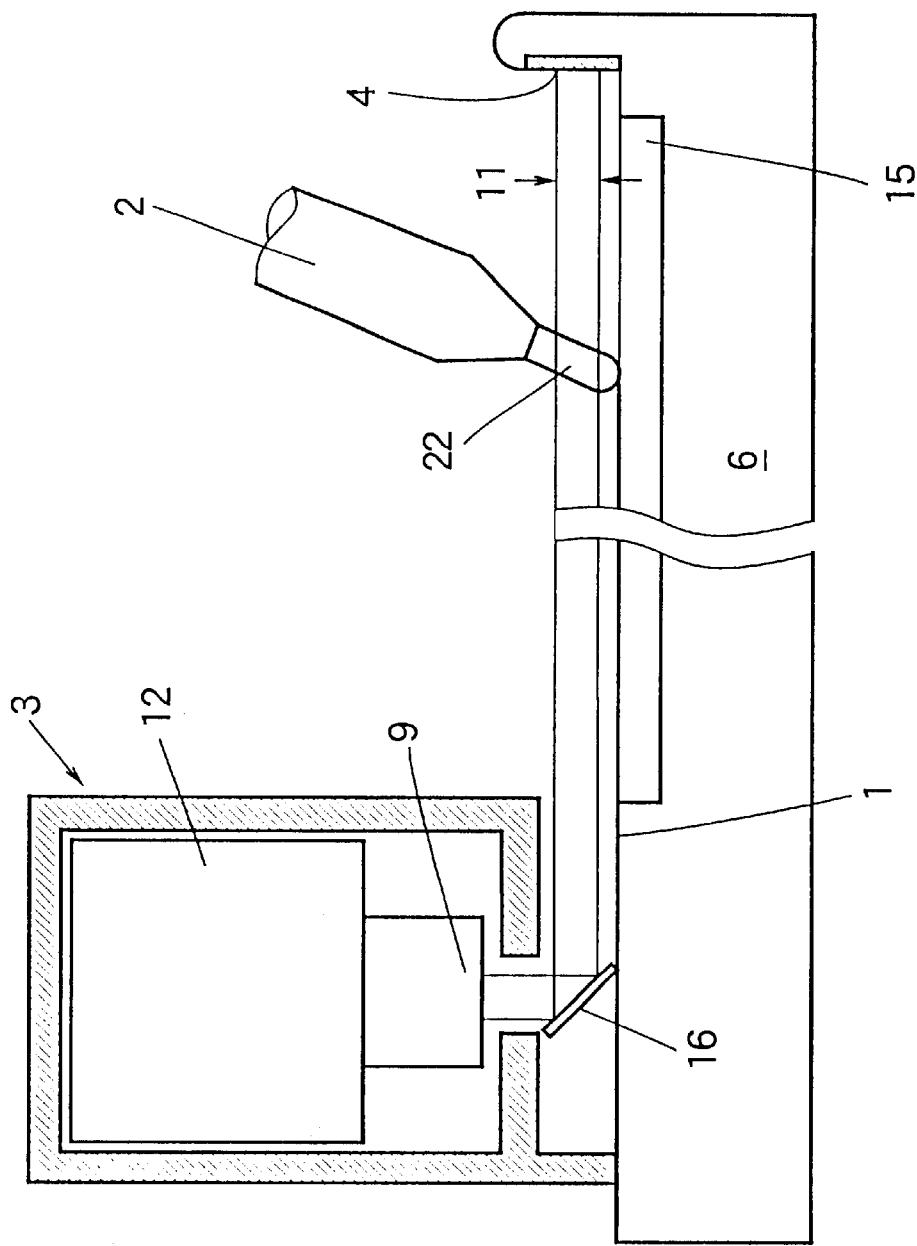
FIG. 17 is a cross section illustrating a detecting unit assembled in the fifth preferred embodiment.

FIG. 17 is a schematic cross section illustrating the specific constitution of the detecting unit 3 shown in FIG. 16. As shown, this optical digitizer has a detecting unit 3 arranged around the coordinate plane 1 to receive projected light and to convert the same into an electrical signal, thereby obtaining positional coordinate of the stylus 2 radiating light directly or indirectly on the coordinate plane 1. Processor means is incorporated in the detecting unit 3 to process the electrical signal to compute the positional coordinate. A lens 9 is mounted in the detecting unit 3 for limiting a view field 11 of the detecting unit 3 below a predetermined height relative to the coordinate plane 1 to make the range of receivable projected light parallel to the coordinate plane 1. In the present embodiment, a color TV camera 12 is used for the detecting unit 3. This color TV camera 12 incorporates a color image sensor. The lens 9 is attached to the color TV camera 12. The lens 9 has an optical axis vertical to the coordinate plane 1. A mirror 16 is arranged on the coordinate plane 1 as reflection means to reflect a projected light component parallel to the coordinate plane 1 at right angles to guide the reflected component to the lens 9. This constitution collects only the component of the light projected from a tip portion 22 of the stylus 2 onto a light receiving surface of the image sensor, thereby making the range of receivable projected light parallel to the coordinate plane 1. Namely, the detecting unit 3 has the lens 9 that forms an image of the stylus 2 onto the image sensor. The mirror 16 is arranged immediately in front of the lens 9 to provide the reflection means for deflecting the light path at right angles. This constitution facilitates installation of the camera unit and positioning adjustment thereof when using a commercially available TV camera lens as the objective lens 9. Further, arranging a shield frame 4 around the coordinate plane 1 realizes the optical digitizer that is hardly affected by extraneous light including a display light projected from a screen 15 of a display panel 6. It should be noted that the present embodiment uses the color image sensor in the detecting unit 3. Therefore, the detecting unit 3 can receive a projected light corresponding to a color assigned to the stylus 2 to output a corresponding electrical signal. The processor means processes this electrical signal to identify the color of the stylus 2 in addition to compute the positional coordinate thereof. Thus, by identifying the stylus color, a particular function such as an eraser can be assigned to the stylus. Further, the above-mentioned constitution allows simultaneous use of two or more styluses having different colors. Still further, the above-mentioned constitution excludes extraneous light by the color identification.

Figure 18:
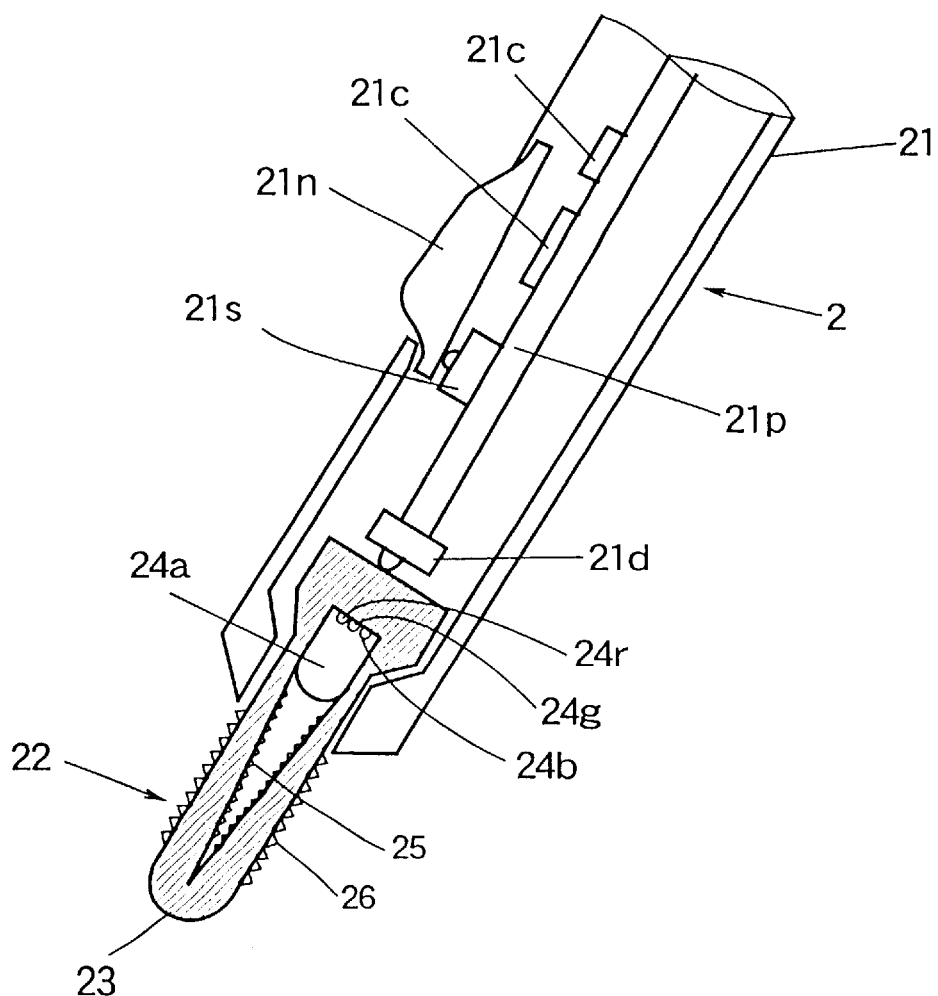
FIG. 18 is a cross section illustrating a stylus for use in the fifth preferred embodiment.

FIG. 18 is a schematic cross section illustrating a specific example of the stylus for use in the fifth preferred embodiment shown in FIG. 16 and FIG. 17. This optical stylus has a construction basically similar to that of the optical stylus shown in FIG. 5. As shown, the stylus 2 is composed of a holder portion 21 and a tip portion 22. The holder portion 21 contains a printed circuit board 21p over which a switch 21s, a side knob 21n, and a circuit component 21c are mounted. The printed circuit board 21p has a writing pressure detector 21d. The tip portion 22 is composed of a light-emitting member and a light guide member 23. The light-emitting member is constituted by a red LED 24r, a green LED 24g, and a blue LED 24b which are covered by a lens 24a. These LED chips are controlled in turn on/off operations by the circuit component 21c mounted on the printed circuit board 21p. The light guide member 23 is constituted by a cylindrical transparent acrylic resin having a bore along the length of the stylus. Bumps and dips are formed on an inner surface 25 and an outer surface 26 of the light guide member 23 to provide a desired light scattering property.

Figure 19:
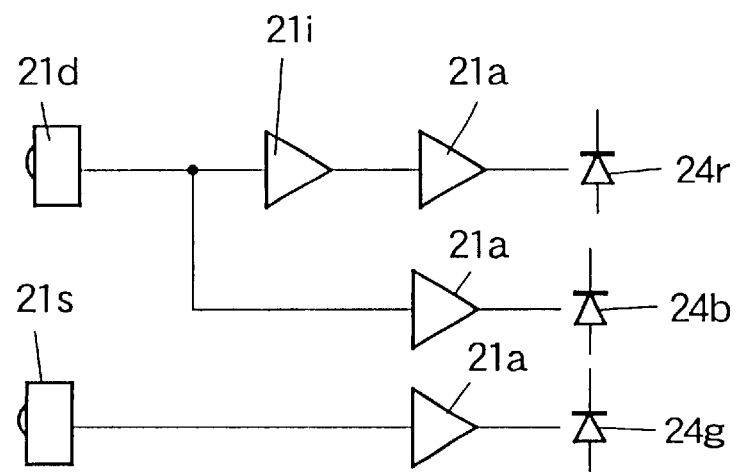
FIG. 19 is a block diagram illustrating a circuit constitution of the stylus shown in FIG. 18.

FIG. 19 is a block diagram illustrating a circuit constitution of the optical stylus shown in FIG. 18. The writing pressure detector 21d is connected to the red LED 24r via an inverting amplifier 21i and an LED driving amplifier 21a. The writing pressure detector 21d is also connected to the blue LED 24b via an LED driving amplifier 21a. The switch 21s is connected to the green LED 24g via an LED amplifier 21a.

Figure 20:
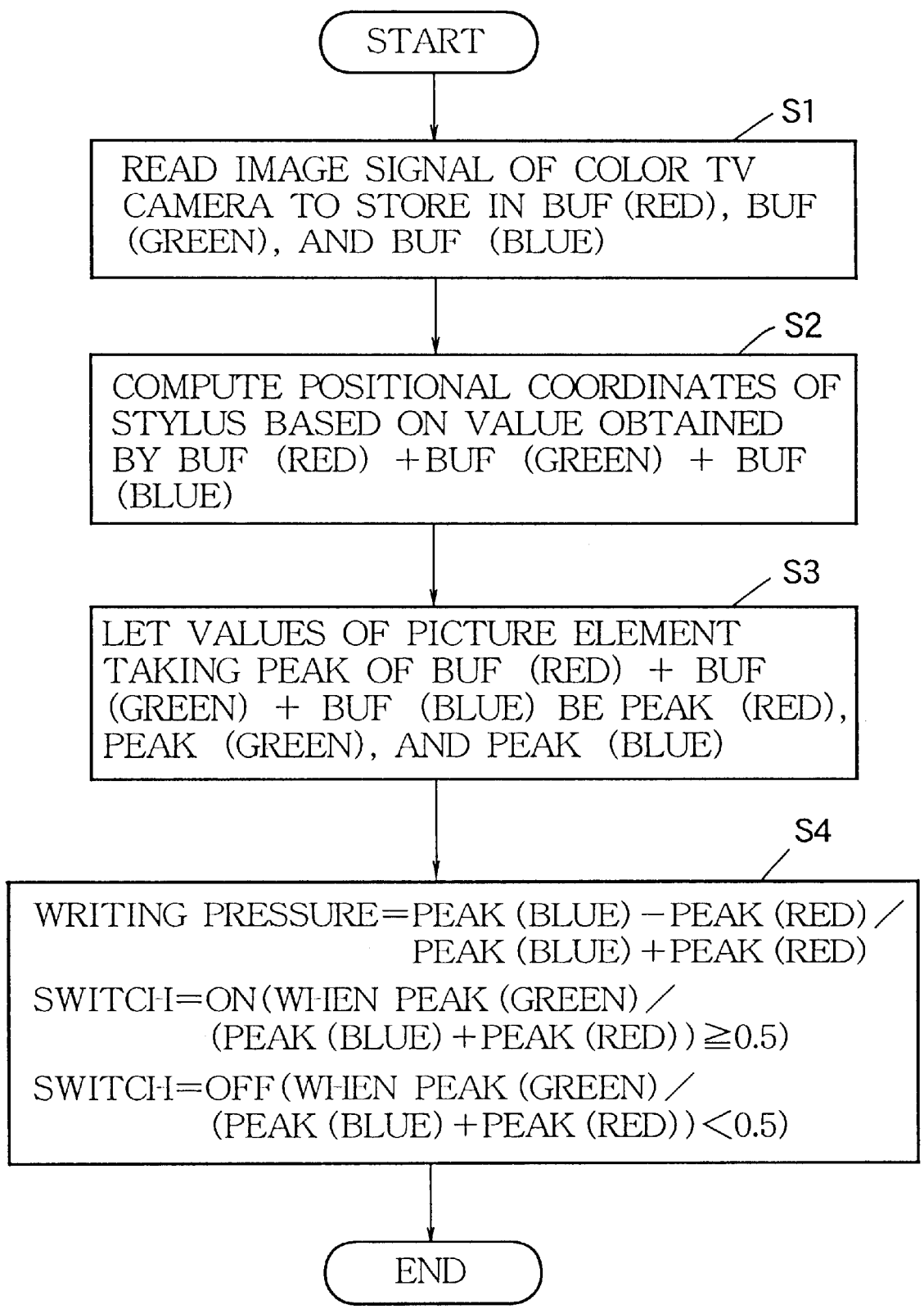
FIG. 20 is a flowchart for describing operations of the fifth preferred embodiment.

The following describes operations of the above-mentioned fifth preferred embodiment with reference to a flowchart shown in FIG. 20. First, in step S1, an image signal output from the color TV camera 12 is read to be stored in a buffer BUF (red), a buffer BUF (green), and a buffer BUF (blue). In step S2, a value of BUF (red)+BUF (green)+BUF (blue) is obtained for each picture element and, based on the obtained value, positional coordinate of the stylus 2 are computed. In step S3, values of the picture element taking peak of BUF (red)+BUF (green)+BUF (blue) are stored in a register PEAK (red), a register PEAK (green), and a register PEAK (blue), respectively. In step S4, based on the values of the registers PEAK (red), PEAK (green), and PEAK (blue), writing pressure information and switch on/off information are computed. As is evident from FIG. 19, as the writing pressure detected by the writing pressure detector 21d increases, the light-emitting quantity of the blue LED 24b increases. Conversely, as the writing pressure detected by the writing pressure detector 21d decreases, a light-emitting quantity of the red LED 24r increases. By detecting such a change in the light-emitting quantity, the writing pressure is obtained in step S4. Also, as is evident from FIG. 19, the green LED 24g is turned on/off according to the on/off operation of the switch 21s in response to operation of the side knob 21n. This change is detected in step S4 to provide switch on/off information.

As described, in the present embodiment, the optical digitizer has the stylus 2 for performing drawing operation and accompanying incidental operation while projecting light directly or indirectly on the coordinate plane 1. The detecting unit 3 is arranged periphery of the coordinate plane 1 to receive the projected light to convert the same into an electrical signal, and the processor means is provided for processing this electrical signal to compute the positional coordinate of the stylus 2. The stylus 2 has modulating means in the form of the circuit shown in FIG. 19 for modulating a color component included in the projected light according to the incidental operation. The detecting unit 3 processes an electrical signal corresponding to the color component included in the projected light. The processor means processes the electrical signal output from the detecting unit 3 to compute the positional coordinate corresponding to the drawing operation done by the stylus 2 and to provide incidental information corresponding to the incidental operation such as the switch operation. The stylus 2 is used for an input device of the optical digitizer that detects a light point moving on the coordinate plane 1, that converts the detected point light into an electrical signal, and that sprocesses this electrical signal to compute the positional coordinate. The stylus 2 has the light point that moves on the coordinate plane 1 as the drawing operation is performed. The stylus 2 has the holder portion 21 to be manipulated for the drawing operation and the accompanying incidental operation, and the tip portion 22 attached with the light-emitting member composed of the red LED 24r, the green LED 24g, and the blue LED 24b, that form the light point. The holder portion 21 has modulation means such as the writing pressure detector 21d and the switch 21s for changing the colors of the point light by controlling the light-emitting member according to the incidental operation, thereby enabling input of the positional coordinate corresponding to the drawing operation and the incidental information corresponding to the incidental operation. Namely, the stylus 2 has the three LEDs 24r, 24g, and 24b having different colors that emit lights separately or simultaneously at a certain ratio. The emitting intensities of these LEDs are controlled according to a writing pressure and a state of the switch (namely, the incidental information of the stylus). The detecting unit has detector means for detecting the color change of the stylus 2 to transmit the incidental information to the digitizer by identifying the stylus color. According to the present embodiment, the incidental or additional information input from the stylus can be transmitted to the optical digitizer without using a special infrared link or radio link.

Figure 21:
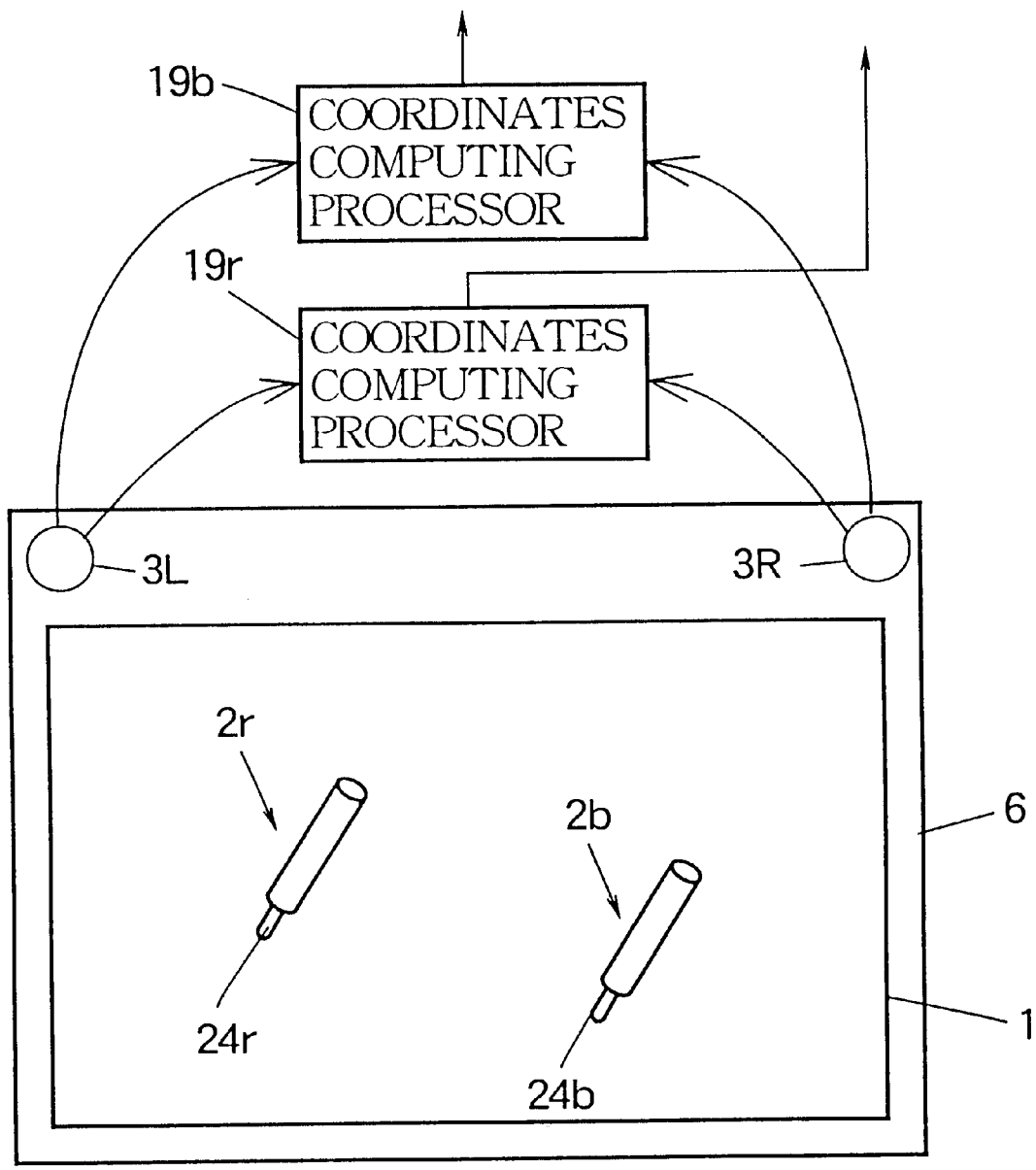
FIG. 21 is a top view illustrating an optical digitizer practiced as a sixth preferred embodiment of the present invention.

FIG. 21 is a schematic top view illustrating a display apparatus and an optical digitizer practiced as a sixth preferred embodiment of the present invention. This embodiment allows the use of two or more styluses at a time. A red stylus 2r having a red LED 24r and a blue stylus 2b having a blue LED 24b for example are disposed on a coordinate plane 1 defined over a display panel 6. Around the coordinate plane 1, a pair of left-hand and right-hand detecting units 3L and 3R are arranged. The pair of left-hand and right-hand detecting units 3L and 3R are connected to each of coordinate computing processors 19r and 19b. The coordinate computing processor 19r processes a red image signal output from the left-hand and right-hand detecting units 3L and 3R to output the positional coordinate of the red stylus 2r. The other coordinate computing processor 19b processes a blue image signal output from the left-hand and the right-hand detecting units 3L and 3R to output the positional coordinate of the blue stylus 2b. Thus, the detecting units 3L and 3R are used for outputting color separated images assigned to these styluses.

Figure 22:
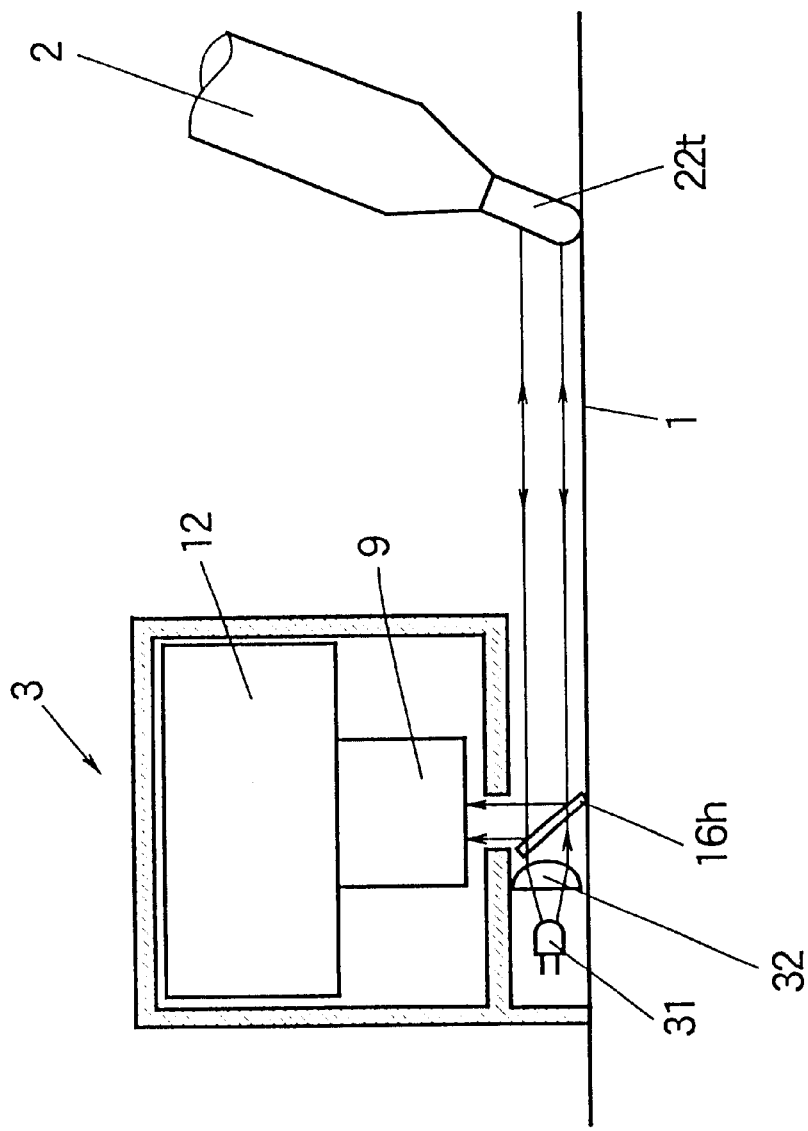
FIG. 22 is a cross section illustrating an optical digitizer practiced as a seventh preferred embodiment of the present invention.

FIG. 22 is a schematic partial cross section illustrating an optical digitizer practiced as a seventh preferred embodiment of the present invention. This embodiment is basically similar to the fifth embodiment shown in FIG. 17, and therefore components similar to those previously described with FIG. 17 are denoted by the same reference numerals for ease of understanding. In the seventh embodiment, a half mirror 16h is used in place of the mirror used in the fifth embodiment. In the rear of this half mirror 16h, a light source 31 is arranged via a cylindrical lens 32. Via the half mirror 16h, the light source 31 illuminates a stylus 2 having a recursive retroreflecting member 22t. A TV camera 12 incorporated in the detecting unit 3 receives, via the half mirror 16h, the projected light retroreflected from the illuminated stylus 2. For the retroreflecting member 22t, many minute corner cube prisms for example may be used. These prisms are an extremely efficient retroreflecting member, so that the light-emitting intensity of the light source 31 can be saved. The above-mentioned constitution enhances the illumination efficiency and, at the same time, prevents the undesired reflective light of the stylus caused by extraneous light from entering into the detecting units.

Figure 23:
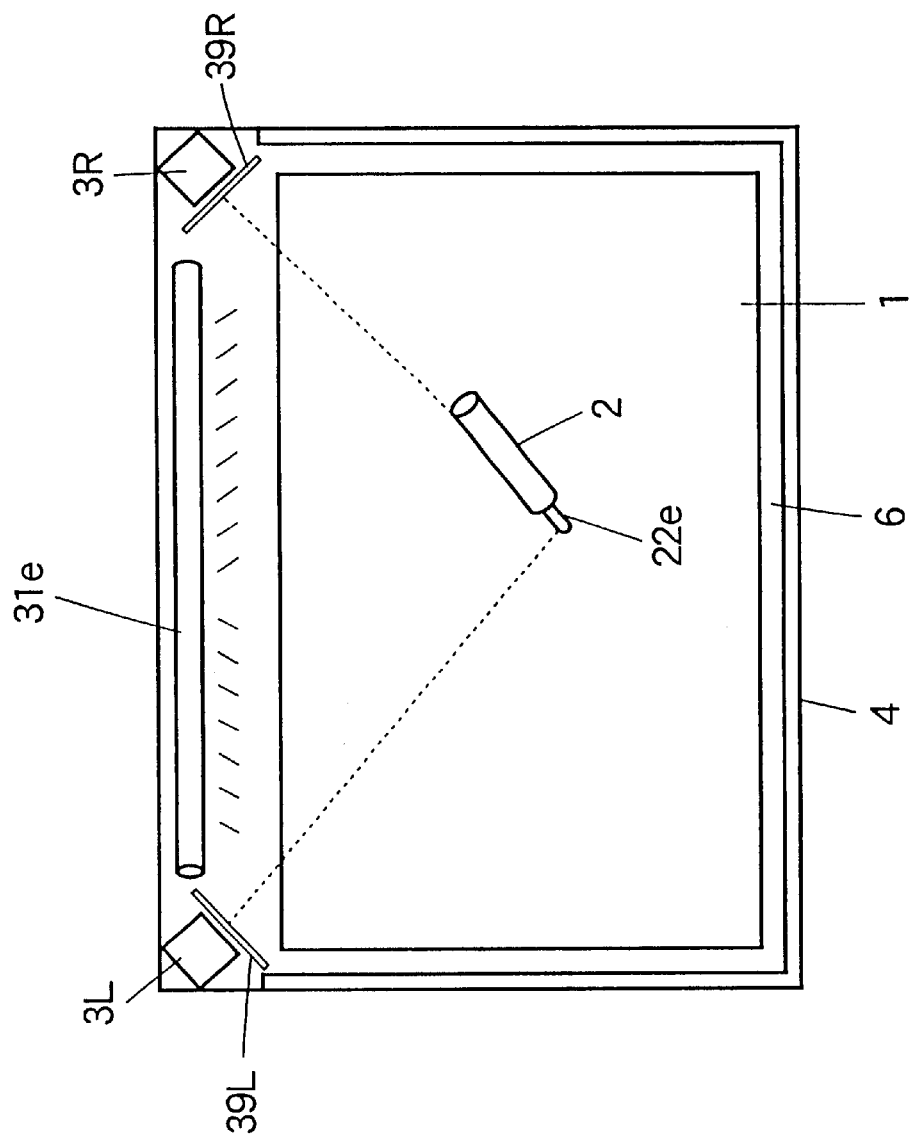
FIG. 23 is top view illustrating an optical digitizer practiced as an eighth preferred embodiment of the present invention.
Figure 24:
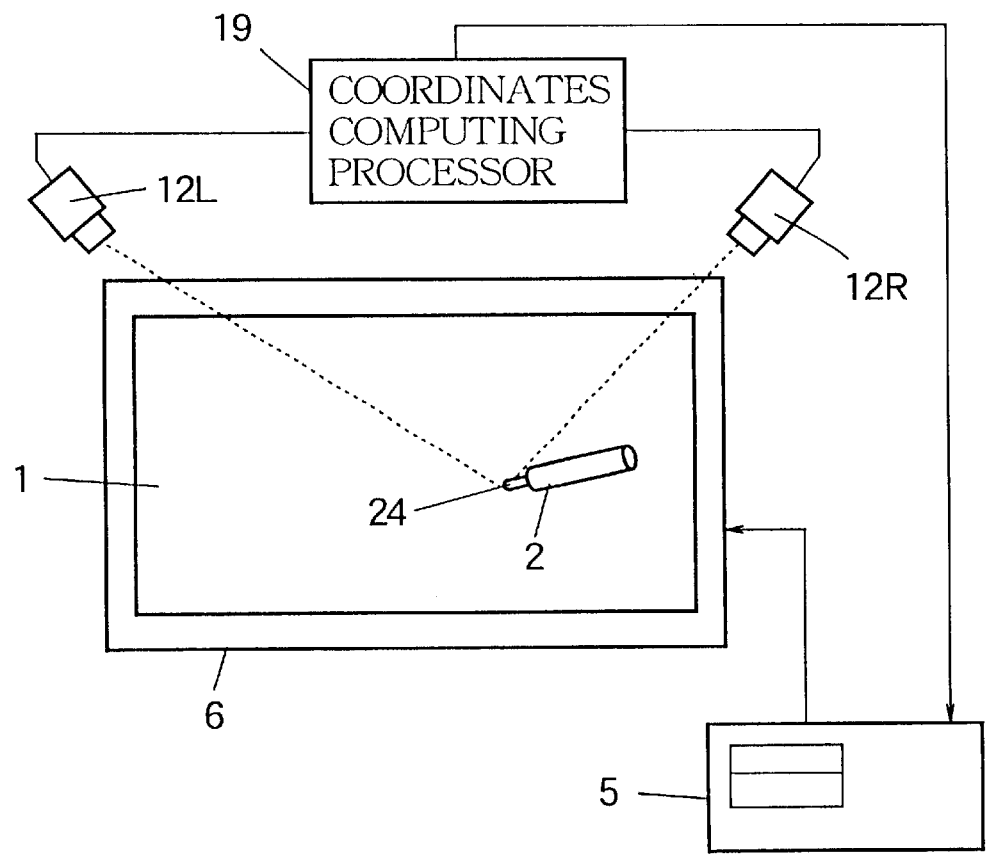
FIG. 24 is a schematic diagram illustrating a prior art optical digitizer.
Figure 25:
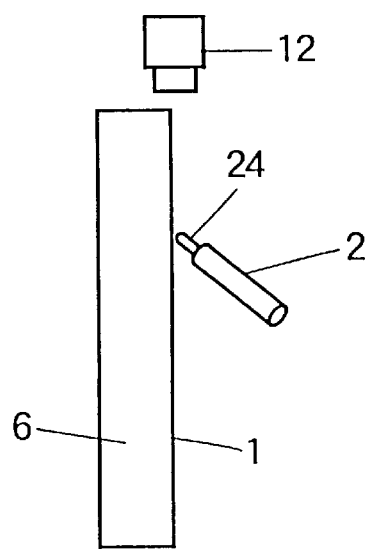
FIG. 25 is a side view illustrating the prior art optical digitizer shown in FIG. 24.

FIG. 23 is a top view illustrating a display apparatus and an optical digitizer practiced as an eighth preferred embodiment of the present invention. The eighth embodiment is basically similar to the second embodiment shown in FIG. 6. In order to obtain the positional coordinate of a stylus 2 that projects light on a coordinate plane 1 defined above a display panel 6, a pair of left-hand and right-hand detecting units 3L and 3R are arranged around the coordinate plane 1. The detecting units 3L and 3R receive the projected light, and convert the same into an electrical signal. Further, the detecting units process this electrical signal to compute the positional coordinate. As a light source for illuminating the coordinate plane 1, a fluorescent lamp 31e is arranged. Emitting a light of a certain wavelength, the fluorescent lamp 31e illuminates the coordinate plane 1. The left-hand and right-hand detecting units 3L and 3R have optical filters 39L and 39R, respectively, for selectively receiving a projected light of a different wavelength caused by reflection of the illuminating light by the stylus 2 having phosphors 22e. Emitting the light of ultraviolet wavelength, the fluorescent lamp 31e illuminates the coordinate plane 1. The left-hand and right-hand detecting units 3L and 3R have the optical filters 39L and 39R for selectively receiving the projected light of a visible wavelength caused by the reflection of the illuminating light by the stylus 2 having the phosphors 22e. According to the above-mentioned constitution, the noise light originating from other than the stylus 2 can be distinguished for exclusion, thereby providing a very powerful measure against extraneous light. Moreover, use of the filters prevents the display light and the extraneous light from entering into the detecting units. Further, for the light source, a widely used black light blue fluorescent lamp for example can be used. For the phosphors 22e provided on tip of the stylus 2, an easily available phosphorous material can be used. Therefore, the present embodiment is excellent in cost. The above-mentioned constitution also prevents the illumination from entering into eyes of the operator, thereby enhancing the efficiency of presentation.

As described and according to the invention, the optical digitizer that is strongly resistant to extraneous light including display light is realized. Further, the optical digitizer that reduces the restriction in installing the detecting units and therefore is compact in installation is realized. Still further, the detection of stylus colors is realized to identify a plurality of different styluses, and simultaneously to input coordinate information by a plurality of styluses. Yet further, information incidental to stylus operation such as writing pressure can be transmitted to the optical digitizer in economical way. The above-mentioned advantages are especially conspicuous not only on the optical digitizer according to the invention but also on a display apparatus based on a combination of the optical digitizer according to the invention and a large-sized display panel.

While the preferred embodiments of the present invention have been described using specific terms, such description is for illustrative purposes only, and it is to be understood that changes and variations may be made without departing from the spirit or scope of the appended claims.

What is claimed is:

1. An optical stylus having a point light movable along a coordinate plane according to a drawing operation and being used as an input device for an optical digitizer which converts the point light into an electric signal to compute coordinates of a position of the point light, the optical stylus comprising:
    a holder portion that may be manually manipulated to perform the drawing operation;
    a tip portion protruding from the holder portion and forming the point light, the tip portion comprising a plurality of light-emitting members each for emitting light of a different color and a light guide member for encapsulating the light-emitting members, the light guide member comprising a transparent material having a tubular configuration having a closed tip end, an open end, an outer face and an inner face, the light-emitting members being mounted in the open end, and at least one of the outer face and the inner face being patterned to scatter the light emitted from the light-emitting members; and
    writing force detecting means for detecting a writing force applied to the tip portion and controlling the respective light-emitting members to emit light depending upon the detected writing force.

2. An optical digitizer for determining a position of a pointing object on a coordinate plane and having a detector disposed on a periphery of the coordinate plane and having a field of view covering the coordinate plane for receiving the light projected by the pointing object and for converting the received light into a corresponding electric signal, and a processor for processing the electric signal output by the detector to compute coordinate of the pointing object on the coordinate plane; wherein the pointing object comprises an optical stylus according to claim 1.

3. An optical digitizer according to claim 2; further comprising a collimator disposed to limit the field of view of the detector below a predetermined height relative to the coordinate plane such that through the limited field of view the detector can receive a parallel component of the light which is projected by the pointing object substantially parallel to the coordinate plane; and a shield disposed to enclose the periphery of the coordinate plane to block out light other than the projected light from entering into the limited field of view of the detector.

4. An optical stylus having a point light movable along a coordinate plane according to a drawing operation and being used as an input device for an optical digitizer which converts the point light into an electric signal to compute coordinate of a position of the point light, the optical stylus comprising:
    a holder portion that may be manually manipulated to perform the drawing operation;
    a tip portion protruding from the holder portion and forming the point light, the tip portion comprising light-emitting means for emitting a light of different wavelengths and a light guide member for encapsulating the light-emitting means, the light guide member comprising a transparent material having a tubular configuration having a closed tip end, an open end, an outer face and an inner face, the light-emitting means being mounted in the open end; and
    and writing force detecting means for detecting a writing force applied to the tip portion and controlling the light-emitting means to emit light of a wavelength depending upon the detected writing force.

5. An optical stylus according to claim 4; wherein at least one of the inner and outer faces of the light guide member is patterned to scatter the light emitted by the light-emitting means.

6. An optical stylus according to claim 4; wherein the light-emitting means comprises a plurality of light-emitting diodes each for emitting a light of a different color.

7. An input device for a computing system, comprising: a movable housing; a plurality of light-emitting elements contained in the housing each for projecting a light of a different color externally of the housing so that the position of the housing can be monitored based on the projected light; and modulation means for controlling the light-emitting elements in response to force applied to the housing portion to change a color of the light projected by the light-emitting elements, and including means for detecting a writing force applied to the housing and controlling the respective light-emitting elements to emit light depending upon the detected force and including means for detecting a writing force applied to the housing and controlling the respective light-emitting elements to emit light depending upon the detected force.

8. An input device according to claim 7; wherein the movable housing comprises a holding portion that may be manually manipulated to perform a drawing operation on a coordinate plane, a tip portion extending from the holding portion, and a light guide member for encapsulating the light-emitting elements.

9. An input device according to claim 8; wherein the light guide member comprises a transparent material having a tubular configuration and having a closed tip end, an open end, an outer face and an inner face, the light-emitting elements being mounted in the open end.

10. An input device according to claim 9; wherein at least one of the outer face and the inner face of the light guide member is patterned to scatter the light emitted by the light-emitting elements.

* * * * *